United States Patent
Jiang et al.

(10) Patent No.: US 7,809,242 B2
(45) Date of Patent: Oct. 5, 2010

(54) RECORDING RESOURCE LIMITATION RESOLUTION

(75) Inventors: Vivian Nan Jiang, Union City, CA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 1131 days.

(21) Appl. No.: 11/426,261

(22) Filed: Jun. 23, 2006

(65) Prior Publication Data

US 2008/0010518 A1 Jan. 10, 2008

(51) Int. Cl.
H04N 5/91 (2006.01)
(52) U.S. Cl. .......................... 386/83; 386/125
(58) Field of Classification Search ............. 386/46, 386/83, 95, 125
See application file for complete search history.

(56) References Cited

U.S. PATENT DOCUMENTS

| | | | |
|---|---|---|---|
| 5,825,359 | A | 10/1998 | Derby et al. |
| 6,857,129 | B2 | 2/2005 | Rogson et al. |
| 7,369,750 | B2 * | 5/2008 | Cheng et al. .......... 386/83 |
| 2004/0103434 | A1 | 5/2004 | Ellis |
| 2004/0218905 | A1 * | 11/2004 | Green et al. .......... 386/83 |
| 2005/0166230 | A1 | 7/2005 | Gaydou et al. |
| 2005/0204388 | A1 | 9/2005 | Knudson et al. |
| 2005/0251750 | A1 | 11/2005 | Vallone et al. |
| 2005/0251826 | A1 | 11/2005 | Orr |
| 2006/0020359 | A1 | 1/2006 | Wu |
| 2006/0037048 | A1 | 2/2006 | DeYonker et al. |

FOREIGN PATENT DOCUMENTS

WO WO2005002214 1/2005
WO WO2005107367 11/2005

OTHER PUBLICATIONS

Biehl, et al. "ARIS: An Interface for Application Relocation in an Interactive Space", Canadian Human-Computer Comm Society, Proceedings of graphics Interface 2004, May 17-19, Ontario, pp. 107-116.
Hirose, "CABIN—A multiscreen display for computer experiments", available at http://csdl2.computer.org/persagen/DLAbsToc.jsp?resourcePath=/dl/proceedings/&tocnomp/proceedings/vsmnn/1997/8150/00/8150toc.xml&DOI=10.1109/VSMM.1997.622333>>, accessed on Jun. 22, 2006, 1 page.
Klein, et al. "Supporting Conflict Resolution in Cooperative Design Systems", IEEE Transactions on System, Man and Cybernetics. Special Issue on Distributed Artificial Intelligence, vol. 21, No. 6, Dec. 1991, pp. 1-22.
Ogata, et al. "A real-time volume rendering architecture using an adaptive resampling scheme for parallel and perspective projections", IEEE, 1998, pp. 31-38.

* cited by examiner

Primary Examiner—Huy T Nguyen
(74) Attorney, Agent, or Firm—Lee & Hayes, PLLC

(57) ABSTRACT

Recording resource limitation resolution is described. In one implementation a time period is detected during which programs are designated to be recorded, and during which at least one of the designated programs cannot be recorded due to a recording resource limitation. All possible combinations to record the designated programs which will resolve the recording resource limitation can be determined using an iterative selection process. A recording conflict user interface is displayed, and any one of the possible combinations which will resolve the recording resource limitation can be selected via the recording conflict user interface. Other implementations are also described.

20 Claims, 9 Drawing Sheets

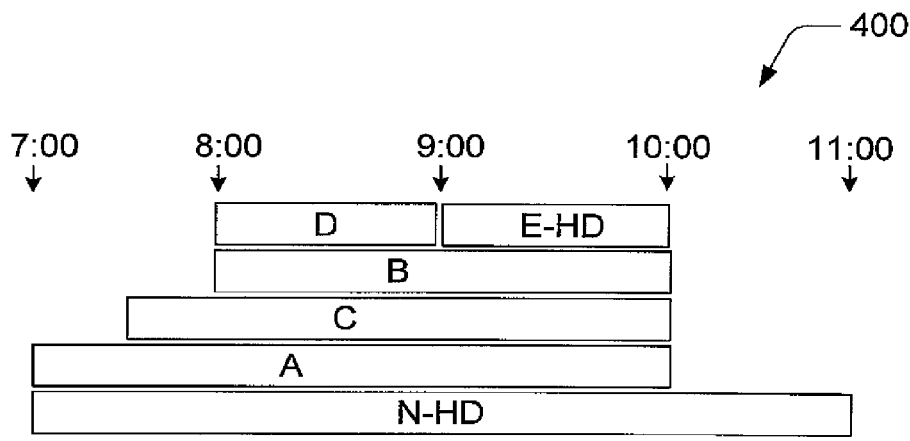
Fig. 4A
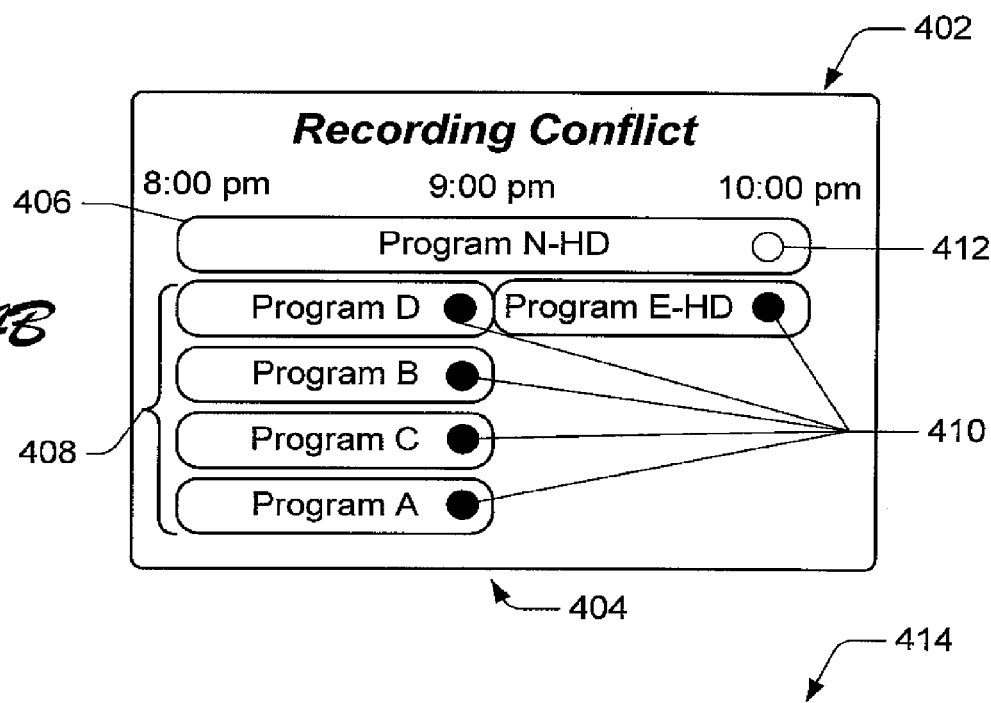
Fig. 4B
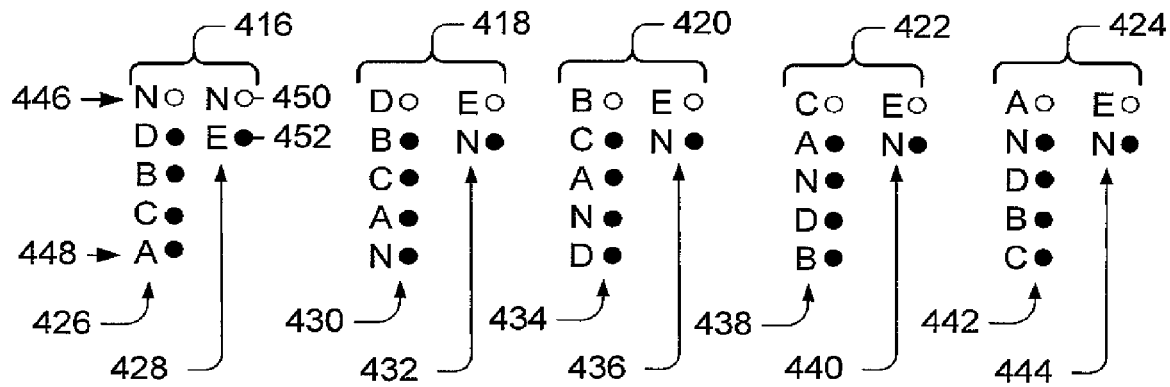
Fig. 4C  Ordered Lists Corresponding to Possible Combinations

RECORDING RESOURCE LIMITATION RESOLUTION

BACKGROUND

During the past several years, television viewing habits have been rapidly changing in response to advances in technology, and to increased availability of viewing content. Many people are now using digital video recorders to view television programs and/or other visual content. A digital video recorder (DVR) is an electronic device that records television programs to a hard disc and/or other data store in a digital format. The digital video recorder allows a user to view a recorded program at a later time, and in many cases allows the user to pause live television, to replay interesting scenes, and otherwise manipulate recorded programs.

Current digital video recording devices typically provide that a user can program a DVR to record programs which have been selected by the user. Unfortunately, the user cannot record an unlimited number of programs at any one time due to various recording resource limitations.

These recording resource limitations include constraints such as the number of tuners in a DVR, and/or the amount of bandwidth available from an IP-based content delivery system. For example, if a DVR has two tuners, a user can only watch and/or record two programs at the same time. Therefore, if the user is recording two programs during a time period, and wants to record a third program during the same time period that two other programs are being recorded, a recording conflict will occur since there are not enough tuners available to satisfy this request.

Resolving problems which are related to recording resource limitations can be difficult for a user, especially when the problem involves several different programs which have recording times that overlap in various possible recording combinations of the several different programs.

SUMMARY

This summary is provided to introduce simplified concepts of recording resource limitation resolution that are further described below in the Detailed Description. This summary is not intended to identify essential features of the claimed subject matter, nor is it intended for use in determining the scope of the claimed subject matter.

In an embodiment of recording resource limitation resolution, a time period is detected during which programs are designated to be recorded, and during which at least one of the designated programs cannot be recorded due to a recording resource limitation. All possible combinations to record the designated programs which will resolve the recording resource limitation can be determined using an iterative selection process. A recording conflict user interface can be displayed, and any one of the possible combinations which will resolve the recording resource limitation can be selected via the recording conflict user interface.

In another embodiment of recording resource limitation resolution, program identifiers can be associated with the designated programs such that each one of the designated programs is uniquely identified. The program identifiers can be arranged into an ordered list that includes a first position and a last position. The first position of the ordered list is a non-record position, such that only the designated programs associated with the program identifiers located in other than the first position of the ordered list will be recorded during the time period of the recording resource limitation. The ordered list of program identifiers can be iterated through by sequentially moving each one of the program identifiers from the first position of the ordered list to the last position of the ordered list, so that each one of the program identifiers in the ordered list can be located at the first position. As a result, every possible combination of the designated programs which can be recorded during the time period of the recording resource limitation can be generated.

BRIEF DESCRIPTION OF THE DRAWINGS

The same numbers are used throughout the drawings to reference like features and components:

FIGS. 4A-4C illustrate a third example of recording resource limitation resolution.

DETAILED DESCRIPTION

Recording resource limitation resolution is described in which embodiments provide that a user can resolve program recording conflicts, such as when more programs are designated to be recorded than a recording system can accommodate. Recording resource limitation resolution can assist a user by iterating through and providing all of the possible program recording combinations such that the user can select the best combination of programs based on a preference of the user.

For example, a time period can be detected when a recording resource limitation prevents the user from recording all of the programs designated by the user to be recorded. A recording resource limitation can also be referred to herein as a resource contingent problem and/or as a recording conflict. A recording resource limitation problem can occur when the user designates more than one program to be recorded during a time period, and at least one of the designated programs cannot be recorded during the time period due to some recording resource limitation.

The inability to record all of the designated programs at a particular time can be due to any recording resource limitation, such as not having enough tuners to tune and record the programs, not having enough bandwidth to receive and record the programs, and/or other similar causes. When a time period of a recording resource limitation is detected, all of the possible combinations to record the designated programs which resolve the recording resource limitation can be determined using an iterative selection process. A recording conflict user interface can be displayed via which any of the possible combinations which will resolve the recording resource limitation can be displayed for user selection. The user can view one, some, and/or all of the possible combinations, and can then select the combination of programs which is to be recorded.

While aspects of the described systems and methods for recording resource limitation resolution can be implemented in any number of different computing systems, environments, television-based entertainment systems, and/or configurations, embodiments of recording resource limitation resolution are described in the context of the following exemplary environment and system architectures.

Figure 1:
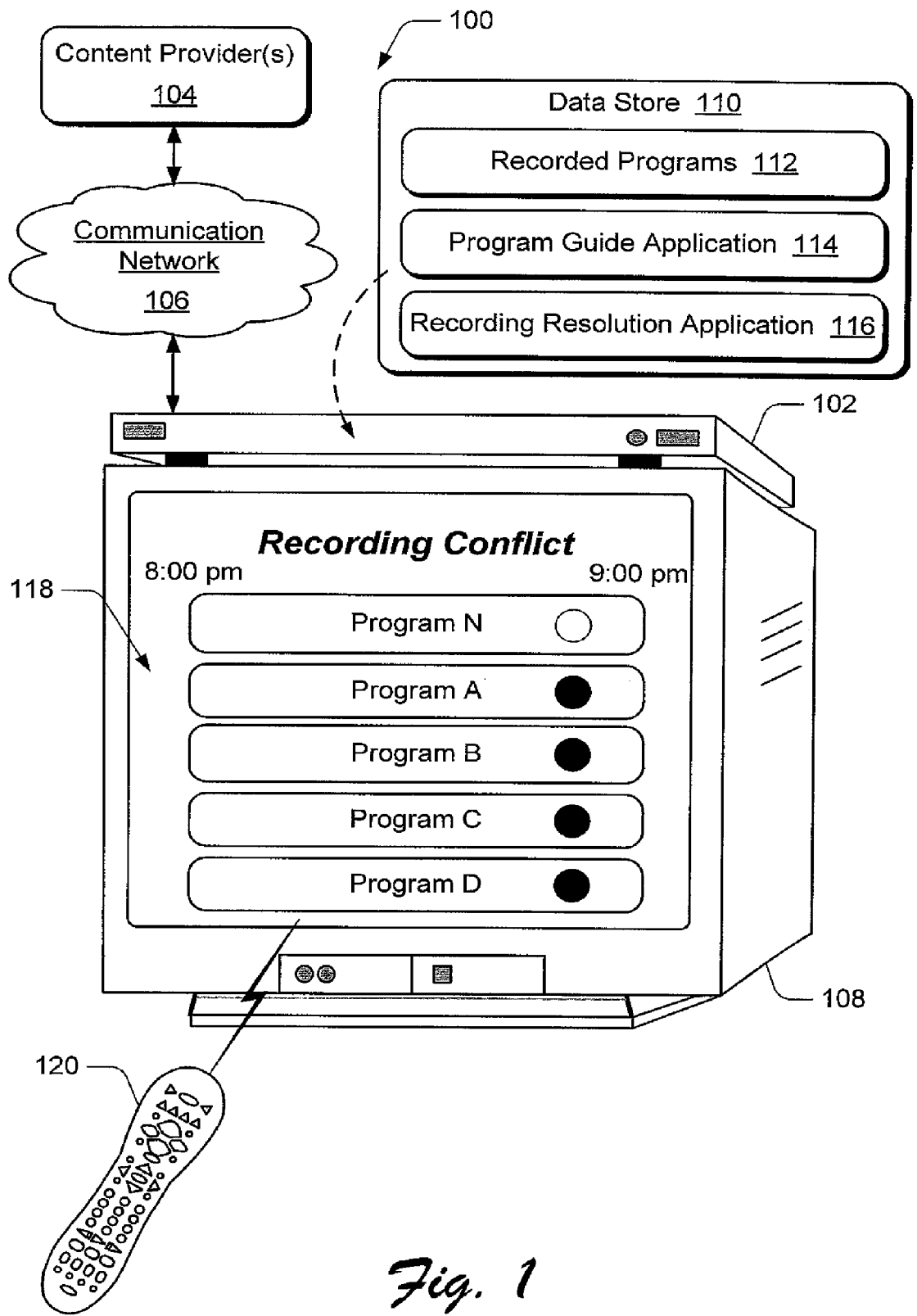
FIG. 1 illustrates an exemplary television-based system in which embodiments of recording resource limitation resolution can be implemented.

FIG. 1 illustrates an exemplary television-based system 100 in which embodiments of recording resource limitation resolution can be implemented. The television-based system 100 includes an exemplary television-based client device 102 configured for data communication with any number of content provider(s) 104 via a communication network 106. The television-based client device 102 receives content such as television programs, and receives program guide data, advertising content, and other various forms of media content and the like from content server(s) of the content provider(s) 104 via the communication network 106.

The television-based client device 102 is connected to a display device 108. The display device 108 can be any type of television, liquid crystal display (LCD), or similar television-based system that renders audio, video, and/or image data. The television-based client device 102 can be implemented in any number of embodiments as any type of client device that may be implemented in a television-based entertainment and information system and used in resolving recording resource limitations as described herein. In the illustration, the television-based client device 102 is a digital video recorder (DVR) and playback system. Alternatively, the television-based client device 102 can be implemented as part of, or within, the display device 108. The television-based client device 102 and display device 108 together are but one example of a television-based system, examples of which are described with reference to the exemplary IP-based television (IPTV) system 700 shown in FIG. 7, and with reference to the exemplary entertainment and information system 900 shown in FIG. 9.

In an embodiment, the television-based client device 102 can be implemented with any one or combination of the components described with reference to television-based client device 800 shown in FIG. 8. The television-based client device 102 is an example of client device 800 shown in FIG. 8. Further, any combination of the components described with reference to the television-based system 100 can be implemented in the exemplary IP-based television (IPTV) system 700 shown in FIG. 7, and/or with the exemplary entertainment and information system 900 shown in FIG. 9.

The television-based client device 102 includes a data store 110 configured to store recorded programs 112 that are recorded when received from the content providers 104, a program guide application 114, and a recording resolution application 116. The data store 110 can be any kind of computer readable media that provides data storage mechanisms to store various information and/or data such as software applications and any other types of information and data related to operational aspects of the television-based client device 102. Examples of such computer readable media are described below with reference to client device 800 shown in FIG. 8. The program guide application 114 can be configured to assist the user in navigating to programs of interest, and in programming the recording of such programs.

In another implementation, rather than being located at the television-based client device 102, the recording resolution application 116 can be located elsewhere in the communication network 106, such that the recording resolution application 116 is available via the network. In yet another implementation, the recording resolution application 116 can be distributed across the television-based client device 102 and the network 106.

In another implementation, the data store 110 can be located elsewhere in the communication network 106 and/or can be distributed across the television-based client device 102 and the network 106 such that the television-based client device 102 can access recorded programs, and/or program guide information, and/or the recording resolution application 116 via the network. In one implementation, the recording resolution application 116 is part of a network digital video recorder (DVR) system which can be distributed at one or more locations across the network 106.

In various embodiments of recording resource limitation resolution, the recording resolution application 116 can: (1) detect a time period during which programs are designated to be recorded, and during which one of the designated programs cannot be recorded due to a recording resource limitation; (2) determine all possible combinations to record the designated programs which will resolve the recording resource limitation using an iterative selection process; and (3) display a recording conflict user interface 118 via which any one of the possible combinations which will resolve the recording resource limitation can be selected.

The television-based client device 102 provides the user with a convenient option which allows the user to view one, some, or all of the possible combinations to record the designated programs which will resolve the recording resource limitation, so that the user can easily choose which one of the possible combinations of designated programs is to be recorded. The possible combinations can be presented to the user via the recording conflict user interface 118 and can be easily navigated using a remote control 120. For example, when a resource contingent problem is detected, the recording conflict user interface 118 is provided to display any one of the possible combinations of programs which can be recorded and which can be selected to resolve the recording resource limitation. The recording conflict user interface 118 can display for the user one, some, and/or all of the possible combinations to record the designated programs which will resolve the recording resource limitation. The user can then select which programs are to be recorded to resolve the recording resource limitation. Each of these features is described in further detail below.

Figure 2A:
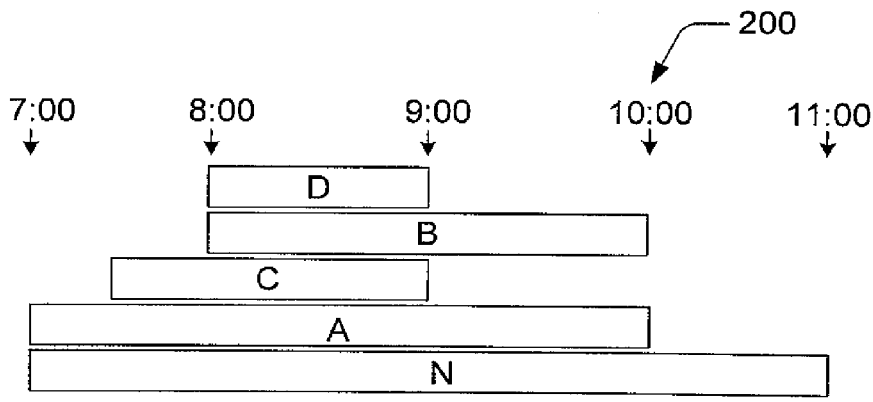
FIGS. 2A-2C illustrate a first example of recording resource limitation resolution.
Figure 2B:
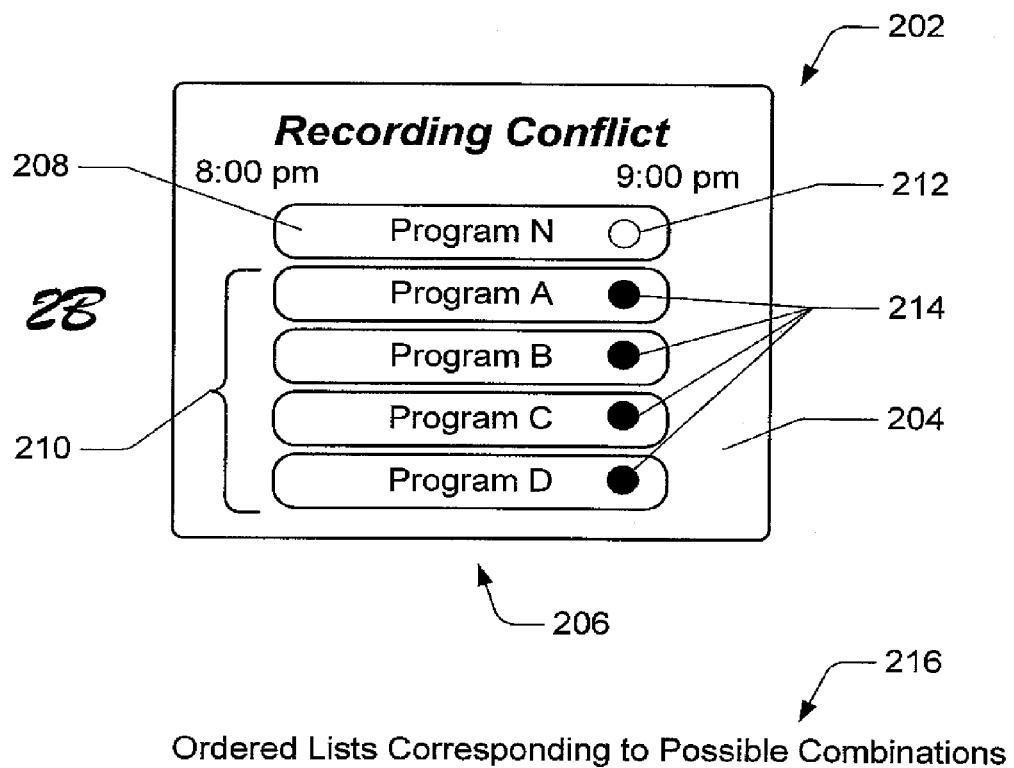
Figure 2C:
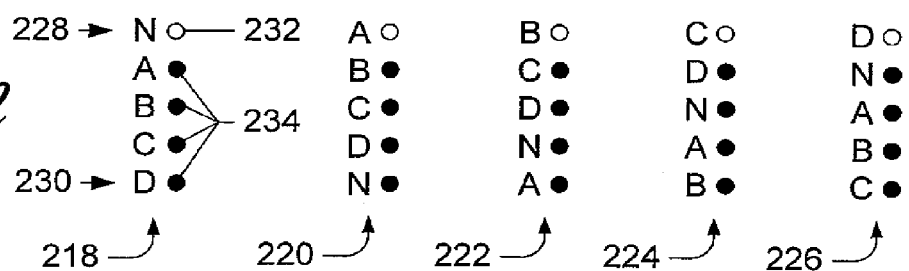

FIGS. 2A-2C illustrate an example of recording resource limitation resolution in which a recording resource limitation problem occurs when a user wants to record five programs during the same time period (and designates the five programs for recording).

FIG. 2A illustrates a time line 200 showing each of the programs designated to be recorded. Time line 200 shows that four different programs are initially designated—program A, program B, program C, and program D, as the programs to be recorded. As shown, program A is to be recorded from 7:00 p.m. to 10:00 p.m., program B is to be recorded from 8:00 p.m. to 10:00 p.m., program C is to be recorded from 7:30 p.m. to 9:00 p.m., and program D is to be recorded from 8:00 p.m. to 9:00 p.m. As illustrated, the recording of the four designated programs (i.e., programs A, B, C, and D) overlap such that all four designated programs are to be simultaneously recorded during the 8:00 p.m. and 9:00 p.m. time period. In the present example, recording the four designated programs (i.e., programs A, B, C, and D) simultaneously during the 8:00 p.m. and 9:00 p.m. time period does not create a recording resource limitation problem.

Continuing with this example, after initially designating four programs (i.e., programs A, B, C, and D) to be recorded, the user may decide to record a new program (i.e., program N), from 7:00 p.m. to 11:00 p.m. When program N is designated to be recorded in addition to the programs A, B, C, and D which were previously designated to be recorded, a recording resource limitation problem is created during the 8:00 p.m. to 9:00 p.m. time period, since five programs (i.e., programs A, B, C, D, and N) are now designated for recording during this time period, and the available bandwidth and/or system recording resources may not support recording the five programs. The time period where the recording resource limitation causes a problem can also be referred to herein as "the time period of the recording resource limitation", as "the period of contention" and/or as "the period of conflict". In the present example, it is not possible to satisfy the program recording requests because there are simply not enough tuners available to record the designated programs. Therefore, program N cannot be recorded, unless one or more of the other designated programs (i.e., programs A, B, C, and/or D) are not recorded. Once the time period of the recording resource limitation has been detected, all possible combinations to record the designated programs which will resolve the recording resource limitation can be determined using an iterative selection process.

FIG. 2B illustrates a simplified representation of a recording conflict user interface 202 which can be presented to the user. One, some, and/or all of the possible combinations to record the designated programs which will resolve the recording resource limitation can be made available to the user via the recording conflict user interface 202, such that the user can view one or more of the possible combinations, and can then select which programs to record to resolve the recording resource limitation.

Different implementations of the recording conflict user interface 202 can include different renderings, of which the rendering shown in FIG. 2B is but one example. For example, in one implementation the recording conflict user interface 202 presents a graphical representation of the time period 204 of the recording resource limitation (e.g., the 8:00 p.m. to 9:00 p.m. time period of FIG. 2B) but does not present other time periods.

In one implementation, the recording conflict user interface 202 can present a graphical representation of the designated programs 206 (e.g., programs A, B, C, D, and N). The graphical representation of the designated programs 206 can include the designated programs which cannot be recorded due to the recording resource limitation 208 (e.g., program N), and can also include the designated programs which are included in the possible combination which can be recorded 210 (e.g., programs A, B, C, and D). The designated program(s) which cannot be recorded due to the recording resource limitation can also be referred to herein as "the non-record group". The designated programs which are included in the combination which can be recorded can also be referred to herein as "the record group" and represent a subset of the designated programs. In one implementation, the graphical representation of the designated program 206 which cannot be recorded due to the recording resource limitation (e.g., program N) is identified by a non-record marker 212, and the designated programs which are to be recorded (e.g., programs A, B, C, and D) are each be identified by record markers 214. In this example and others herein, a non-record marker is illustrated as a circle that is not filled-in, whereas a record marker is illustrated as a circle that is filled-in.

In the present example, the recording conflict user interface 202 can present a visual representation all five different designated programs (i.e., programs A, B, C, D, and N) to the user. However, because of the recording resource limitation problem, only four of the five programs can be recorded during the time period of the recording resource limitation. Since any one of the five designated programs can be assigned to the non-record group, there are five possible combinations to record the designated programs which will resolve the recording resource limitation. These five possible combinations are described in detail below.

FIG. 2C provides an illustration 216 showing ordered lists of program identifiers (e.g., ordered lists 218, 220, 222, 224, and 226) which correspond to the five possible combinations to record the designated programs 206 which will resolve the recording resource limitation. In the present example, program identifier "N" corresponds to "Program N", program identifier "A" corresponds to "Program A", program identifier "B" corresponds to "Program B", and so forth.

The possible combinations to record the designated programs 206 can be determined by: (1) associating program identifiers (e.g., Program Identifiers A, B, C, D, and N of ordered list 218) with the designated programs 206 (e.g., Programs A, B, C, D, and N) such that each one of the designated programs 206 is uniquely identified; (2) arranging the program identifiers into an ordered list (e.g., ordered list 218) including a first position 228 and a last position 230, where the first position 228 of the ordered list 218 is a non-record position such that only the designated programs 206 associated with the program identifiers located in other than the first position 228 of the ordered list 218 will be recorded during the time period of the recording resource limitation; and (3) iterating through the ordered list of program identifiers 218 by sequentially moving each one of the program identifiers from the first position 228 of the ordered list 218 to the last position 230 of the ordered list 218, such that each one of the program identifiers in the ordered list 218 can be located at the first position 228, and such that every possible combination of the designated programs 206 which can be recorded during the time period can be generated.

In the present example, each one of the five different possible combinations to record the designated programs 206 which will resolve the recording resource limitation is represented as an ordered list (or stack) of program identifiers (which correspond respectively to the designated programs). For example, the first ordered list 218 corresponds to the first possible combination to record the designated programs which will resolve the recording resource limitation, the second ordered list 220 corresponds to the second possible combination to record the designated programs which will resolve the recording resource limitation, and the third ordered list 222 corresponds to the third possible combination to record the designated programs which will resolve the recording resource limitation. Similarly, the fourth ordered list 224 corresponds to the fourth possible combination to record the designated programs which will resolve the recording resource limitation, and the fifth ordered list 226 corresponds to the fifth possible combination to record the designated programs which will resolve the recording resource limitation.

In the present example, each one of the possible combinations to record the designated programs 206 which will resolve the recording resource limitation is adequately represented as a single ordered list, which lists the program identifiers associated with the designated programs the user would like to record during the segment of the time period represented by that ordered list. In other cases, examples of which will be discussed in detail below, each of the possible combinations can be better represented if the ordered list is divided into two or more stacks.

When discussing these ordered lists (i.e., 218, 220, 222, 224, and 226), the first position (e.g., top position) 228 of each ordered list is a non-record position, such that only the designated programs associated with the program identifiers located in other than the first position 228 of the ordered list will be recorded during the time period of the recording resource limitation. For ease of discussion, FIG. 2C shows a non-record marker 232 adjacent to the first position 228 of each of the ordered lists and also shows record markers 234 next to the remaining positions of the ordered lists. These record markers 234 and non-record markers 232 are shown in FIG. 2C merely as a visual aid to remind the reader of this document which program identifiers are associated with programs which are to be recorded, and which program identifiers are associated with programs which are not to be recorded.

The recording resolution application 116 (FIG. 1) is implemented to incrementally generate the ordered lists (i.e., 218, 220, 222, 224, and 226), and to keep track of the possible combinations of programs to record which correlate to the ordered lists. The ordered lists (i.e., 218, 220, 222, 224, and 226) therefore illustrate the iterative process of the recording resolution application 116. The possible combinations of programs to record which correlate to the ordered lists can be translated into a graphical representation of programs (which includes record and non-record indicators) to be displayed via the recording conflict user interface (as shown in FIG. 2B).

Now each of the possible combinations represented by the five ordered lists (i.e., 218, 220, 222, 224, and 226) is described in detail. The first possible combination, represented by the first ordered list 218, corresponds to the initial state which was described above with reference to FIG. 2B. In the first ordered list 218, the program identifier N (associated with program N) is located at the first position 228 of the ordered list of program identifiers 218 (i.e., is located at the top of the stack). The four other program identifiers A, B, C, and D are listed below program identifier N, and are respectively associated with programs A, B, C, and D. The first ordered list of program identifiers 218 corresponds to the first possible combination (or state) to record the designated programs which resolve the recording resource limitation.

The initial ordering of the first list in this example (e.g., ordered list 218 of FIG. 2C), and/or of the first list in the additional examples shown (FIGS. 3C and 4C) can be arbitrary or can be "intelligent". One example of an intelligent ordering is to arrange the program identifiers based on priority, so that when the recording resource application 116 executes, the lower priority program identifiers will move to the first/non-record position 228 sooner. The recording resource application 116 is implemented to take the initial order of the list, and to incrementally generate one or more of the additional ordered lists as described herein. In the present example (FIG. 2C), the first ordered list 218 of program identifiers is initially ordered as follows: program identifier N is located in the first position 228 (i.e., non-record position), followed by A, B, C, and D in record positions.

It should be appreciated that priority is but one way to give an initial order to the first ordered list (e.g., ordered list 218 of FIG. 2C). Regardless of how the list is initially ordered, once the initial order is established, the iterative selection process proceeds according to the order in the list, such that the program identifier that becomes associated with the non-record marker 232 is whichever program identifier happens to be located at the top (i.e., first position) 228 of the list.

The first possible combination includes recording programs A, B, C, and D (e.g., a subset of the designated programs 206), but does not include recording program N. The first possible combination of programs (which corresponds to the first ordered list of program identifiers 218), can be presented to the user via the recording conflict user interface 202 (as shown in FIG. 2B). The user may choose to accept this first possible combination to resolve the recording resource limitation, and forgo recording program N, or the user may decide to record program N.

If the user decides to record program N, and clicks on (or otherwise selects) program N via the recording conflict user interface 202, several changes will take place at the first ordered list 218. For example, the program identifier N (which is associated with program N) will move to the last position 230 of the first ordered list 218 and will become associated with a record marker 234 indicating that designated program N (which is associated with the program identifier N) will be recorded. After program identifier N moves to the bottom (i.e., last position) 230 of the first ordered list 218, program identifier A will be located at the top (i.e., first position/non-record position) 228 of the first ordered list 218.

The second ordered list 220 represents the configuration of the first ordered list 218 after these changes take place. Thus, the second ordered list 220 corresponds to the second possible combination (or second state) to record the designated programs which will resolve the recording resource limitation. The second possible combination includes recording programs B, C, D, and N (e.g., a subset of the designated programs 206), but does not include recording program A. The user may choose to accept this second possible combination, and forgo recording program A, or the user may decide to record program A.

If the user decides to record program A, and clicks on (or otherwise selects) program A via the recording conflict user interface 202, several changes will take place at the second ordered list 220. For example, the program identifier A (which is associated with program A) will move to the last position 230 of the second ordered list 220 and will become associated with a record marker 234 indicating that program A (which is associated with the program identifier A) will be recorded. After program identifier A moves to the bottom (i.e., last position) 230 of the second ordered list 220, program identifier B will be located at the top (i.e., first position/non-record position) 228 of the second ordered list 220.

The third ordered list 222 represents the configuration of the second ordered list 220 after these changes take place. Thus, the third ordered list 222 corresponds to the third possible combination (or third state) to record the designated programs which will resolve the recording resource limitation. The third possible combination includes recording programs C, D, N, and A (e.g., a subset of the designated programs 206), but does not include recording program B. The user may choose to accept this third possible combination, and forgo recording program B, or the user may decide to record program B.

If the user decides to record program B, and clicks on (or otherwise selects) program B via the recording conflict user interface 202, several changes will take place at the third ordered list 222. For example, the program identifier B (which is associated with program B) will move to the last position 230 of the third ordered list 222 and will become associated with a record marker 234 indicating that designated program B (which is associated with the program identifier B) will be recorded. After the program identifier B moves to the bottom (i.e., last position) 230 of the third ordered list 222, program identifier C will be located at the top (i.e., first position/non-record position) 228 of the third ordered list 222.

The fourth ordered list 224 represents the configuration of the third ordered list 222 after these changes take place. Thus, the fourth ordered list 224 corresponds to the fourth possible combination (or fourth state) to record the designated programs which will resolve the recording resource limitation. The fourth possible combination includes recording programs D, N, A, and B (e.g., a subset of the designated programs 206), but does not include recording program C. The user may choose to accept this fourth possible combination, and forgo recording program C, or the user may decide to record program C.

If the user decides to record program C, and clicks on (or otherwise selects) program C via the recording conflict user interface 202, several changes will take place at the fourth ordered list 224. For example, the program identifier C (which is associated with program C) will move to the last position 230 of the fourth ordered list 224 and will become associated with a record marker 234 indicating that program C (which is associated with the program identifier C) will be recorded. After the program identifier C moves to the bottom (i.e., last position) 230 of the fourth ordered list 224, program identifier D will be located at the top (i.e., first position/non-record position) 228 of the fourth ordered list 224.

The fifth ordered list 226 represents the configuration of the fourth ordered list 224 after these changes take place. Thus, the fifth ordered list 226 corresponds to the fifth possible combination (or fifth state) to record the designated programs which will resolve the recording resource limitation. The fifth possible combination includes recording programs N, A, B, and C (e.g., a subset of the designated programs 206), but does not include recording program D. The user may choose to accept this fifth possible combination, and forgo recording program D, or the user may decide to record program D. If the user decides to record program D, and clicks on (or otherwise selects) program D via the graphical user interface 202, the user will be once again presented with the first possible combination of designated programs corresponding to program identifiers of the first ordered list 218.

Each of these five possible combinations to record the designated programs which will resolve the recording resource limitation (e.g., the possible combination of designated programs corresponding to ordered lists 218, 220, 222, 224, and 226) can be displayed to the user via the recording conflict user interface 202. In this fashion, the recording conflict user interface 202 allows the user to view one, some, and/or all of the possible combinations which will resolve the recording resource limitation, and to then select the one possible combination to be recorded. Thus, the recording conflict user interface 202 can present deterministic, complete, and repeatable choices to the user, by cycling through all five possible combinations or states.

FIGS. 3A-3D illustrate an example of recording resource limitation in which two recording resource limitation problems are created when a user wants to record four programs using a DVR which only has two tuners, and some of the recording times overlap.

Figure 3A:
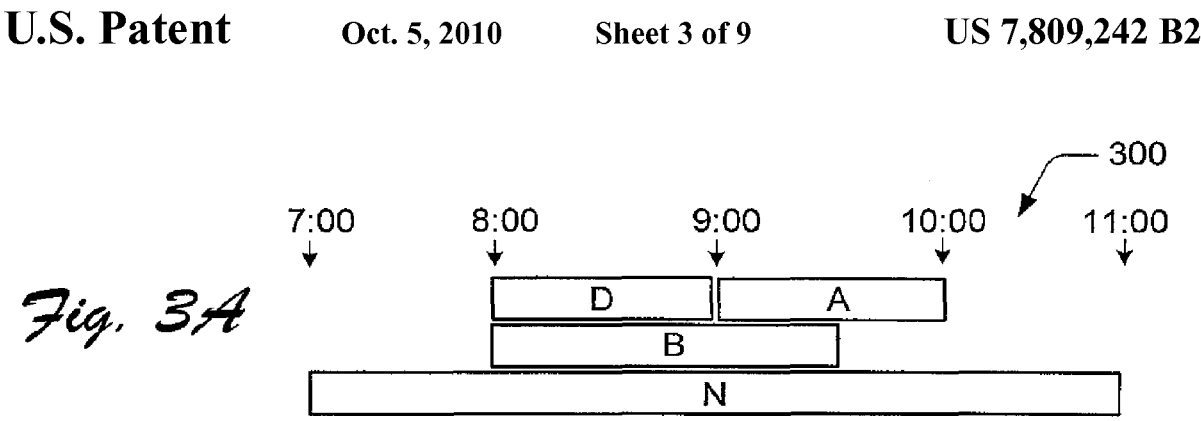
FIGS. 3A-3D illustrate a second example of recording resource limitation resolution.

FIG. 3A illustrates a time line 300 showing the programs designated to be recorded. The time line 300 shows that three different programs are initially designated—program A, program B, and program D. As shown, program A is to be recorded from 9:00 p.m. to 10:00 p.m., program B is to be recorded from 8:00 p.m. to 9:30 p.m., and program D is to be recorded from 8:00 p.m. to 9:00 p.m. Although, three programs (i.e., programs A, B, and D) are designated to be recorded, this does not cause a recording resource limitation problem, since the DVR is able to record two programs at the same time (the DVR has two tuners), and no more than two programs are initially designated for recording at any given time.

Continuing with this example, after scheduling the three programs (i.e., programs A, B, and D), the user may decide to record a new program, program N, from 7:00 p.m. to 11:00 p.m. When the user designates that program N is to be recorded in addition to the programs A, B, and D which were previously designated to be recorded, a recording resource limitation problem is created. In fact, designating program N for recording creates two recording conflicts during the 8:00 p.m. to 9:30 p.m. time period, since the user has now requested that three programs (i.e., programs D, B, and N) be recorded during the 8:00 p.m. to 9:00 p.m. segment of the time period, and that three programs (i.e., programs A, B, and N) be recorded during the 9:00 p.m. to 9:30 p.m. segment of the time period, and the user's DVR only has two tuners to support such recording. In the present case, it is impossible to satisfy the user's programming requests during these two segments of the time period because there are simply not enough tuners available. Therefore, program N cannot be recorded unless one or more of the other requested programs (i.e., programs A, B, and/or D) are not recorded. Once the time period of the recording resource limitation has been detected, all possible combinations to record the designated programs which will resolve the recording resource limitation can be determined by the recording resolution application 116 (FIG. 1) using the iterative selection process.

Figure 3B:
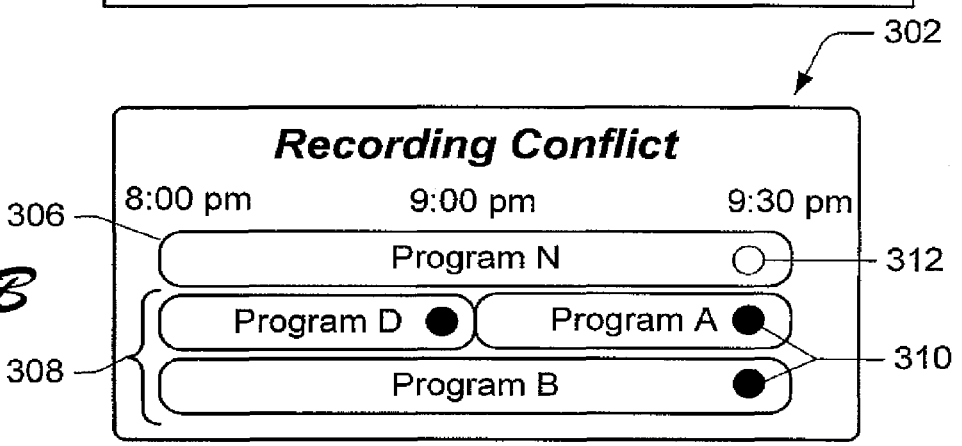

FIG. 3B illustrates a simplified representation of a graphical user interface 302 which can be presented to the user. One, some, and/or all of the possible combinations to record the designated programs which will resolve the recording resource limitation can be made available to the user via the recording conflict user interface 302, such that the user can view one or more of the possible combinations, and can select which programs to record to resolve the recording resource limitation.

The graphical user interface 302 can focus on the time period of the recording resource limitation. For example, here the graphical user interface shows the 8:00 p.m. to 9:30 p.m. period of contention. In the present example, the graphical user interface 302 shows the three programs (i.e., programs A, B, and D) which were initially designated for recording, and also shows the new program, (i.e., program N) that the user later designated to be recorded. The designated programs which are currently scheduled to be recorded (i.e., programs A, B, and D) can each associated with a record marker 310 that indicates these programs are scheduled to be recorded, and the new program (i.e., program N) which led to the recording resource limitation problem can be associated with a non-record marker 312 that indicates that program N is not currently scheduled to be recorded due to the recording resource limitation.

In the present example, program N, which led to the recording resource limitation problem, is displayed at the top of the list of designated programs 304. Programs D and A are shown below program N, showing that program D is scheduled to be recorded from 8:00 p.m. to 9:00 p.m., and that program A is scheduled to be recorded form 9:00 p.m. to 9:30 p.m. Program B is shown below programs D and A, and is scheduled to be recorded from 8:00 p.m. to 9:30 p.m. Thus, the graphical user interface 302 can initially list the new program (e.g., program N) and then list the other designated programs (e.g., programs A, B, and D). The absence of the record marker next to program N indicates that it will not be recorded due to the recording resource limitation, unless the user chooses some other combination of the designated programs 304 which will avoid the recording conflict.

The graphical user interface can present all four programs (i.e., programs A, B, D, and N) to the user. However, due to the recording resource limitation, only two or three of the four designated programs can be recorded, depending on which one of the possible combinations of programs is chosen by the user to resolve the recording resource limitation.

Figure 3C:
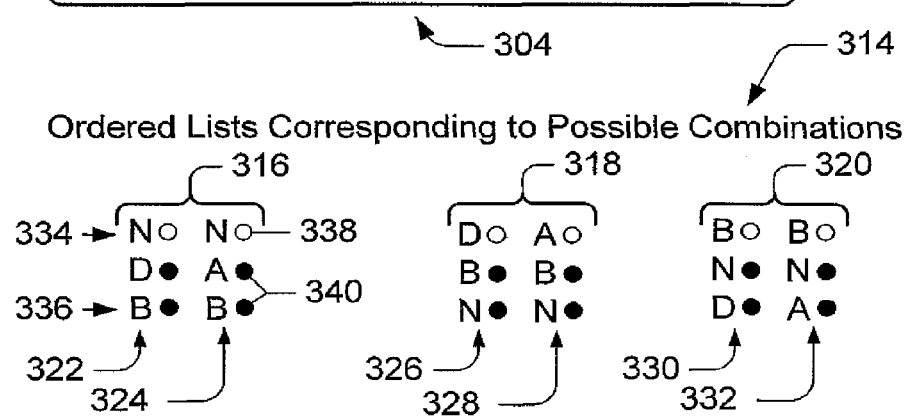

FIG. 3C provides an illustration 314 showing ordered lists of program identifiers (e.g., 316, 318, and 320) which correspond to the three possible combinations to record the designated programs 304 which will resolve the recording resource limitations. In the present example, program identifier "N" corresponds to "Program N", program identifier "A" corresponds to "Program A", program identifier "B" corresponds to "Program B", and program identifier "D" corresponds to "Program D".

In the present example, the first ordered list 316 corresponds to the first possible combination to record the designated programs which will resolve the recording resource limitation, the second ordered list 318 corresponds to the second possible combination to record the designated programs which will resolve the recording resource limitation, and the third ordered list 320 corresponds to the third possible combination to record the designated programs which will resolve the recording resource limitation.

In the present example, each of the three ordered lists (i.e., 316, 318, and 320) is further divided into first and second stacks. The first ordered list 316 includes first stack 322 and second stack 324. The second ordered list 318 includes first stack 326 and second stack 328. The third ordered list 320 includes first stack 330 and second stack 332. In the present example, there are two stacks associated with each of the ordered lists (i.e., 316, 318, and 320), because there are two different conflicts within the 8:00 p.m. to 9:30 p.m. time period. The first conflict occurs between 8:00 p.m. and 9:00 p.m., and the second conflict occurs between 9:00 p.m. and 9:30 p.m. The first stack represents the 8:00 p.m. to 9:00 p.m. segment of the time period, while the second stack represents the 9:00 p.m. to 9:30 p.m. segment of the time period.

Each of these ordered lists (i.e., 316, 318, and 320) have a first position (e.g., top position) 334 and a last position (e.g., bottom position) 336. The first position of each ordered list is a non-record position, such that only the designated programs associated with the program identifiers located in other than the first position 334 of the ordered list will be recorded during the time period of the recording resource limitation. For ease of discussion, FIG. 3C shows a non-record marker 338 adjacent to the first position 334 of each of the ordered lists and also shows record markers 340 next to the remaining positions of the ordered lists. These record markers 340 and non-record markers 338 are shown in FIG. 3C merely as a visual aid to remind the reader of this document which program identifiers are associated with programs which are to be recorded, and which program identifiers are associated with programs which are not to be recorded.

The recording resolution application 116 (FIG. 1) is implemented to incrementally generate the ordered lists (i.e., 316, 318, and 320), and to keep track of the possible combinations of programs to record which correlate to the ordered lists. The ordered lists (i.e., 316, 318, and 320) therefore illustrate the iterative process of the recording resolution application 116. The possible combinations of programs to record which correlate to the ordered lists can be translated into a graphical representation of programs (which includes record and non-record indicators) to be displayed via the recording conflict user interface (as shown in FIG. 3B).

Moving from left to right across FIG. 3C, the three ordered lists (i.e., 316, 318, and 320) are now further described. The first ordered list 316 corresponds to the initial state which was described above with reference to FIG. 3B. In the first ordered list 316, the first stack 322 is now described. Program N is located at the top of the first stack 322 and is associated with a non-record marker 338, while programs D and B are listed respectively below program N, and are each associated with record markers 340. The second stack 324, of the ordered list 316, is now described. Program N is also located at the top of the second stack 324 and is associated with a non-record marker 338, while programs A and B are then listed respectively below program N and are each associated with record markers 340. Thus, the first ordered list 316 corresponds to first possible combination of programs (or first state) which will resolve the recording resource limitation problem, and is represented by stacks 322 and 324. Together stacks 322 and 324 include recording the programs A, B, and D (e.g., a subset of the designated programs 304), but do not include recording program N. The user may choose to accept this first possible combination of programs (or first state) and forgo recording program N, or the user may decide to record program N.

If the user decides to record program N, and clicks on (or otherwise selects) program N via the recording conflict user interface 302, several changes will occur at the stacks 322 and 324. For example, program identifier N (which is associated with program N) will move to the last position 336 of the ordered list 316 and will become associated with a record marker 340 indicating that program N will be recorded. In the present example, the system basically has two choices regarding which option will next be presented to the user. The recording resolution application 116 (FIG. 1) can either move program identifier B to the first/non-record position 334 of each stack, or it move program identifier D to the first/non-record position of stack 322, and move program identifier A to the first/non-record position of stack 324. In the present example, based on the initial order, the recording resolution application 116 moves program identifier D to the first/non-record position of stack 322, and moves program identifier A to the first/non-record position of stack 324.

The second ordered list 318 represents the configuration of the stacks 322 and 324 after these changes occur. The second ordered list 318 corresponds to the second possible combination of programs (or second state) which will resolve the recording resource limitation problem, and is represented by stacks 326 and 328. Together stacks 326 and 328 include recording the programs B and N (e.g., a subset of the designated programs 304), but do not include recording programs D and A. The user may choose to accept this second possible combination of programs and forgo recording programs D and A, or the user may decide to record a different combination of programs.

Continuing with this example, if the user decides to record program A, and clicks on (or otherwise selects) program A via the recording conflict user interface 302, several changes will occur at the stacks 326 and 328. For example, program identifier A will move to the last position 336 of the second stack 328 and will be associated with a record marker 340, indicating that program A will be recorded. However, this will cause program identifier B to lose its record marker 340. In addition, when program identifier B loses its record marker 340, program identifier D will gain a record marker 340. In other words, if program B is not going to be recorded, then the second tuner is available to record program D.

The third ordered list 320 represents the configuration of the stacks 326 and 328 after these changes occur. The third ordered list 320 corresponds to the third possible combination of programs (or third state) which will resolve the recording resource limitation problem, and is represented by stacks 330 and 332. Together stacks 330 and 332 include recording the programs A, D, and N (e.g., a subset of the designated programs 304), but do not include recording program B.

In this fashion, the user interface 302 allows the user to navigate to all possible combinations to record (e.g., corresponding to ordered lists 316, 318, and 320) which will resolve the recording resource limitation. Thus, the graphical user interface presents deterministic, complete, and repeatable choices to the user, by cycling through all possible combinations or states.

Figure 3D:
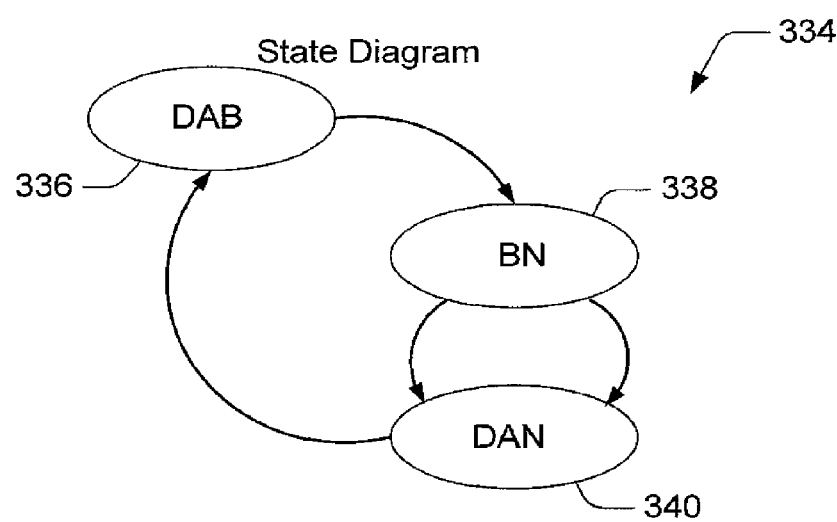

FIG. 3D illustrates a state diagram 334 which provides another way of showing the different possible combinations to record the designated programs which will resolve the recording resource limitation. For example, the first state (or first possible combination) can be represented by programs D, A, and B as shown by reference number 336. The letters that appear in the state identify the programs that are associated with the record markers 340. Thus, in the first state 336, programs D, A, and B are scheduled to be recorded. There can be a transition from the first state 336, for example if the user clicks on (or otherwise selects) program N to be recorded, then you transition to a second state 338 (or second possible combination) represented by programs B and N. In the second state 338, programs B and N are scheduled to be recorded. From the second state 328 there are two different transitions possible, for example, the user can click on either program D or on program A. In this particular example, regardless of whether the user clicks on program D or program A, we arrive at the same third state 340 represented by the programs D, A and N. In the third state 340 (or third possible combination) the programs D, A and N are scheduled to be recorded. Finally, if the user decides against recording this combination of programs the only remaining option is to click on program B and this would lead the user back to the first state 336 where programs D, A, and B are scheduled to be recorded. So the state diagram 334 provides another way of illustrating each of the possible combinations (or states) to record the designated program which will resolve the recording resource limitation.

FIGS. 4A-4C illustrate an example of recording resource limitation resolution in which two recording resource limitation problems are created when a user attempts to record six programs (i.e., four standard-definition (SD) programs and two high-definition (HD) programs) using a DVR which has four tuners, and where some of the recording times overlap. In this example, the user's DVR can record either four SD programs at the same time, or three SD programs and one HD program at the same time. In addition the user's DVR is unable to record two HD programs at the same time. High-definition recorded programs present another issue since a HD program stream requires more bandwidth than does a standard-definition program stream.

FIG. 4A illustrates a time line 400 showing each of the programs designated to be recorded. Time line 400 shows that five different programs are initially designated—program A, program B, program C, program D, and program E. As shown, program A is a SD program which is to be recorded from 7:00 p.m. to 10:00 p.m., program B is a SD program which is to be recorded from 8:00 p.m. to 10:00 p.m., program C is a SD program which is to be recorded from 7:30 p.m. to 10:00 p.m., program D is a SD program which is to be recorded from 8:00 p.m. to 9:00 p.m., and program E is a HD program which is to be recorded from 9:00 p.m. to 10:00 p.m.

Although five programs (i.e., programs A, B, C, D, and E) are initially designated to be recorded, no recording resource limitation problem arises, since the DVR is able to handle these recording requests. For example, from 7:00 p.m. to 7:30 p.m. there is no problem as there is just one SD program designated for recording (i.e., program A). From 7:30 p.m. to 8:00 p.m. there is no problem as there are just two SD programs (i.e., programs A and C) designated for recording. From 8:00 to 9:00 there is no problem as that are just four SD programs (i.e., programs A, C, B, and D) designated for recording. From 9:00 p.m. to 10:00 p.m. there is no problem as there are just three SD programs (i.e., programs A, C, and B) and one HD program (i.e., program E-HD) designated for recording.

Continuing with this example, after designating these five programs (i.e., programs A, B, C, D, and E-HD), assume that the user decides to record a new high definition program (i.e., N-HD) from 7:00 p.m. to 11:00 p.m., and attempts to program his DVR to record program N-HD. The user's designation of this new program (i.e., N-HD) leads to two recording resource limitation problems during the 8:00 p.m. to 10:00 p.m. time period. The first problem occurs because the five programs (i.e., programs A, B, C, D, and N-HD) are now designated to be recorded during the 8:00 p.m. to 9:00 p.m. segment of the time period. The second conflict occurs because two high definition programs (i.e., programs E-HD and N-HD) are now designated to be recorded during the 9:00 p.m. to 10:00 p.m. segment of the time period. In the present case, it is impossible to satisfy the user's requests during the 8:00 p.m. to 9:00 p.m. segment of the time period because the DVR cannot record four SD programs and one HD program at the same time, and impossible to satisfy the user's requests during the 9:00 p.m. to 10:00 p.m. segment of the time period because the DVR cannot record two HD programs at the same time. Once the time period of the recording resource limitation has been detected, all possible combinations to record the designated programs which will resolve the recording resource limitation can be determined using an iterative selection process.

FIG. 4B illustrates a simplified representation of a graphical user interface 402 which can be presented to the user. One, some, and/or all of the possible combinations which will resolve the recording resource limitation can be made available to the user via the graphical user interface 402, such that the user can view the possible combinations and then select which programs to record to resolve the recording resource limitation.

The graphical user interface 402 can focus on the time period of the recording resource limitation. In the present example, the graphical user interface 402 shows the five programs (i.e., programs A, B, C, D, and E-HD) which were initially designated for recording, and also shows the new program, (i.e., program N-HD) that the user later designated for recording. In one implementation the designated programs which are currently scheduled to be recorded (i.e., programs A, B, C, D, and E-HD) are each associated with a record marker (e.g., solid dot) 410 that indicates these programs are scheduled to be recorded, and the new program (i.e., program N-HD) which led to the recording resource limitation problem is associated with a non-record marker (e.g., empty dot or placeholder) 412 that indicates that program N-HD is not currently scheduled to be recorded due to the recording resource limitation. In the present example, the program N-HD which led to the recording resource limitation problem is displayed at the top of the list of designated programs 404, with the other requested programs listed below the new program N-HD in two columns as shown. The non-record marker 412 associated with program N-HD indicates that program N-HD will not be recorded due to the recording resource limitation, unless the user selects some other combination of the designated programs 404 which will resolve the recording resource limitation.

FIG. 4C provides an illustration 414 showing five ordered lists of program identifiers (i.e., 416, 418, 420, 422, and 424) which correspond to five possible combinations to record the designated programs 404 which will resolve the recording resource limitation. In the present example, program identifier "A" corresponds to "Program A", program identifier "B" corresponds to "Program B", program identifier "C" corresponds to "Program C", program identifier "D" corresponds to "Program D", program identifier "E" corresponds to "Program E-HD", and program identifier "N" corresponds to "Program N-HD".

In the present example, the different possible combinations to record the designated programs 404 which will resolve the recording resource limitations are represented as ordered lists of program identifiers (which correspond respectively to the designated programs). For example, the first ordered list 416 corresponds to the first possible combination to record the designated programs which will resolve the recording resource limitation, the second ordered list 418 corresponds to the second possible combination to record the designated programs which will resolve the recording resource limitation, the third ordered list 420 corresponds to the third possible combination to record the designated programs which will resolve the recording resource limitation, the fourth ordered list 422 corresponds to the fourth possible combination to recorded the designated programs which will resolve the recording resource limitation, and the fifth ordered list 424 corresponds to the fifth possible combination to record the designated programs which will resolve the recording resource limitation.

In the present example, each of the ordered lists (i.e., 416, 418, 420, 422, and 424) is further divided into first and second stacks. The first ordered list 416 includes first stack 426 and second stack 428. The second ordered list 418 includes first stack 430 and second stack 432. The third ordered list 420 includes first stack 434 and second stack 436. The fourth ordered list 422 includes first stack 438 and second stack 440. The fifth ordered list 424 includes first stack 440 and second stack 444. In the present example, there are two stacks associated with each of the ordered lists, because there are two different conflicts within the 8:00 p.m. to 10:00 p.m. time period. The first conflict occurs between 8:00 p.m. and 9:00 p.m., and the second conflict occurs between 9:00 p.m. and 10:00 p.m. The first stack represents the 8:00 p.m. to 9:00 p.m. segment of the time period, while the second stack represents the 9:00 p.m. to 10:00 p.m. segment of the time period.

Each of these ordered lists (i.e., 416, 418, 420, 422, and 424) have a first position (e.g., top position) 446 and a last position (e.g., bottom position) 448. The first position 446 of each ordered list is a non-record position, such that only the designated programs associated with the program identifiers located in other than the first position 446 of the ordered list will be recorded during the time period of the recording resource limitation. For ease of discussion, FIG. 4C shows a non-record marker 450 adjacent to the first position 446 of each of the ordered lists and also shows record markers 452 next to the remaining positions of the ordered lists. These record markers 452 and non-record markers 450 are shown in FIG. 4C merely as a visual aid to remind the reader of this document which program identifiers are associated with programs which are to be recorded, and which program identifiers are associated with programs which are not to be recorded.

The recording resolution application 116 (FIG. 1) is implemented to incrementally generate the ordered lists (i.e., 416, 418, 420, 422, and 424), and to keep track of the possible combinations of programs to record which correlate to the ordered lists. The ordered lists (i.e., 416, 418, 420, 422, and 424) therefore illustrate the iterative process of the recording resolution application 116. The possible combinations of programs to record which correlate to the ordered lists can be translated into a graphical representation of programs (which includes record and non-record indicators) to be displayed via the recording conflict user interface (as shown in FIG. 4B).

Moving from left to right across FIG. 4C, the ordered lists (i.e., 416, 418, 420, 422, and 424) are now discussed. The first ordered list 416 corresponds to the first possible combination or initial state which was described above with reference to FIG. 4B. In the first ordered list 416, program identifier N (corresponding to program N-HD) is initially located at the top of the first stack 426 and is associated with a non-record marker 450. Program identifiers D, B, C, and A (corresponding respectively to programs D, B, C, and A) are then listed respectively below program identifier N and are each associated with record markers 452. In the first ordered list 416, program identifier N (corresponding to program N-HD) is also located at the top of the second stack 428 and is associated with a non-record marker 450. Program identifier E (corresponding to program E-HD) is listed below program identifier N, and is associated with a record marker 452. Thus, the first ordered list 416 corresponds to the first possible combination of programs (or first state) to record the designated programs 404 which will resolve the recording resource limitations, and is represented by the stacks 426 and 428. Together stacks 426 and 428 include recording programs A, B, C, D, and E-HD (e.g., a subset of the designated programs 404), but do not include recording program N-HD. The user may choose to accept this first possible combination of programs and forgo recording program N-HD, or the user may decide to record program N-HD.

If the user decides to record program N-HD, and clicks on (or otherwise selects) program N-HD via the recording conflict user interface 402, several changes occur at the stacks 426 and 428. For example, program identifier N (which corresponds to program N-HD) will move to the last position 448 of the ordered list 416 (i.e., to the last position 448 of the first stack 426, and to the last position 448 of the second stack 428), and will become associated with a record marker 452 indicating that program N-HD will be recorded. In the present example, we will assume that program identifier D (corresponding to program D) will lose it record marker 452 and will now be located at the first position (top) 446 of the first stack 426, and that program identifier E (corresponding to program E-HD) will lose its record marker 452 and will be located at the first position (top) 446 of the second stack 428.

The second ordered list 418 represents the configuration of stacks 426 and 428 after these changes occur. The second ordered list 418 corresponds to the second possible combination of programs (or second state) which will resolve the recording resource limitation, and is represented by stacks 430 and 432. Together stacks 430 and 432 include recording the programs A, B, C, and N-HD (e.g., a subset of the designated programs 404), but do not include recording programs D and E-HD. The user may choose to accept this second possible combination of programs and forgo recording programs D and E-HD, or the user may decide to make another selection.

For, example, if the user decides to record program D, and clicks on (or otherwise selects) program D via the recording conflict user interface 402, program identifier D (which corresponds to program D) will move to the last position 448 of the first stack 430, and will become associated with a record marker 452 indicating that program D will be recorded. In the present example, we will assume that program identifier B (corresponding to program B) will lose its record marker 452 and will now be located at the first position (top) 446 of the first stack 430. No change occurs at the second stack 432.

The third ordered list 420 represents the configuration of stacks 430 and 432 after these changes occurs. The third ordered list 420 corresponds to the third possible combination of programs (or third state) which will resolve the recording resource limitation, and is represented by stacks 434 and 436. Together stacks 434 and 436 include recording programs A, C, D, and N-HD (e.g., a subset of the designated programs 404), but do not include recording programs B and E-HD. The user may choose to accept this third possible combination of programs and forgo recording programs B and E-HD, or the user may decide to make another selection.

For example, if the user decides to record program B, and clicks on (or otherwise selects) program B via the recording conflict user interface 402, program identifier B (which corresponds to program B) will move to the last position 448 of the first stack 434, and will become associated with a record marker 452 indicating that program B will be recorded. In the present example, we will assume that program identifier C (corresponding to program C) will lose its record marker 452 and will now be located at the first position (top) 446 of the first stack 434. No change occurs at the second stack 436.

The fourth ordered list 422 represents the configuration of stacks 434 and 436 after these changes occur. The fourth ordered list 422 corresponds to the fourth possible combination of programs (or fourth state) which will resolve the recording resource limitation, and is represented by stacks 438 and 440. Together stacks 438 and 440 include recording programs A, B, D, and N-HD (e.g., a subset of the designated programs 404), but do not include recording programs C and E-HD. The user may choose to accept this fourth possible combination of programs and forgo recording programs C and E-HD, or the user may decide to make another selection.

If the user decides to record program C, and clicks on (or otherwise selects) program C via the recording conflict user interface 402, program identifier C (which corresponds to program C) will move to the last position 448 of the first stack 438, and will become associated with a record marker 452 indicating that program C will be recorded. In the present example, we will assume that program identifier A (corresponding to program A) will lose its record marker 452 and will now be located at the first position (top) 446 of the first stack 438. No change occurs at the second stack 440.

The fifth ordered list 424 represents the configuration of stacks 438 and 440 after these changes occur. The fifth ordered list 424 corresponds to the fifth possible combination of programs (or fifth state) which will resolve the recording resource limitation, and is represented by stacks 442 and 444. Together stacks 442 and 444 include recording programs B, C, D, and N-HD (e.g., a subset of the designated programs 404), but do not include recording programs A and E-HD. The user may choose to accept this fifth possible combination of programs and forgo recording programs A and E-HD, or the user may decide to make another selection.

If the user decides to record program E-HD, and clicks on (or otherwise selects) program E-HD via the recording conflict user interface 402, the user will once again be presented with the first ordered list of program identifiers 416 which corresponds to the first possible combination of programs which can be recorded to resolve the recording resource limitation. When the user selects program E-HD for recording, program N-HD will not be recorded, and the recording resource limitation will be resolved. The user can repeats this process, and cycle through all of the different possible combinations (or states) to record the designated programs which will resolve the recording resource limitation.

It should be noted that in the present example (shown in FIG. 4C), although only five different ordered lists corresponding to possible combinations are illustrated (i.e., 416, 418, 420, 422, and 424), there are additional ordered lists which can be generated. For example, at ordered list 422, if the user decides to record program E-HD, and clicks on (or otherwise selects) program E-HD via the user interface 402, program identifier E will move to the last position 448 of the second stack 440, and will become associated with a record marker 452 indicating that program E-HD will be recorded. Program identifier N will move to the first position/non-record position 446 of both the first stack 438 and the second stack 440. In addition, program identifier C will move to the last position 448 of the first stack 438 and will become associated with a record marker 452. These changes lead to an additional ordered list (not show), the program identifiers of this additional ordered list correspond to recording programs A, B, C, D, and E-HD, but do not correspond to recording program N-HD. FIG. 4B shows the visual representation of programs to be recorded, or the combination of designated programs to be recorded based on this additional ordered list. Therefore, both this additional ordered list (not show) and the first ordered list 416 correspond to the same combination of programs to be recorded.

Methods for recording resource limitation resolution, such as exemplary methods 500 and 600 described with reference to respective FIGS. 5 and 6, may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
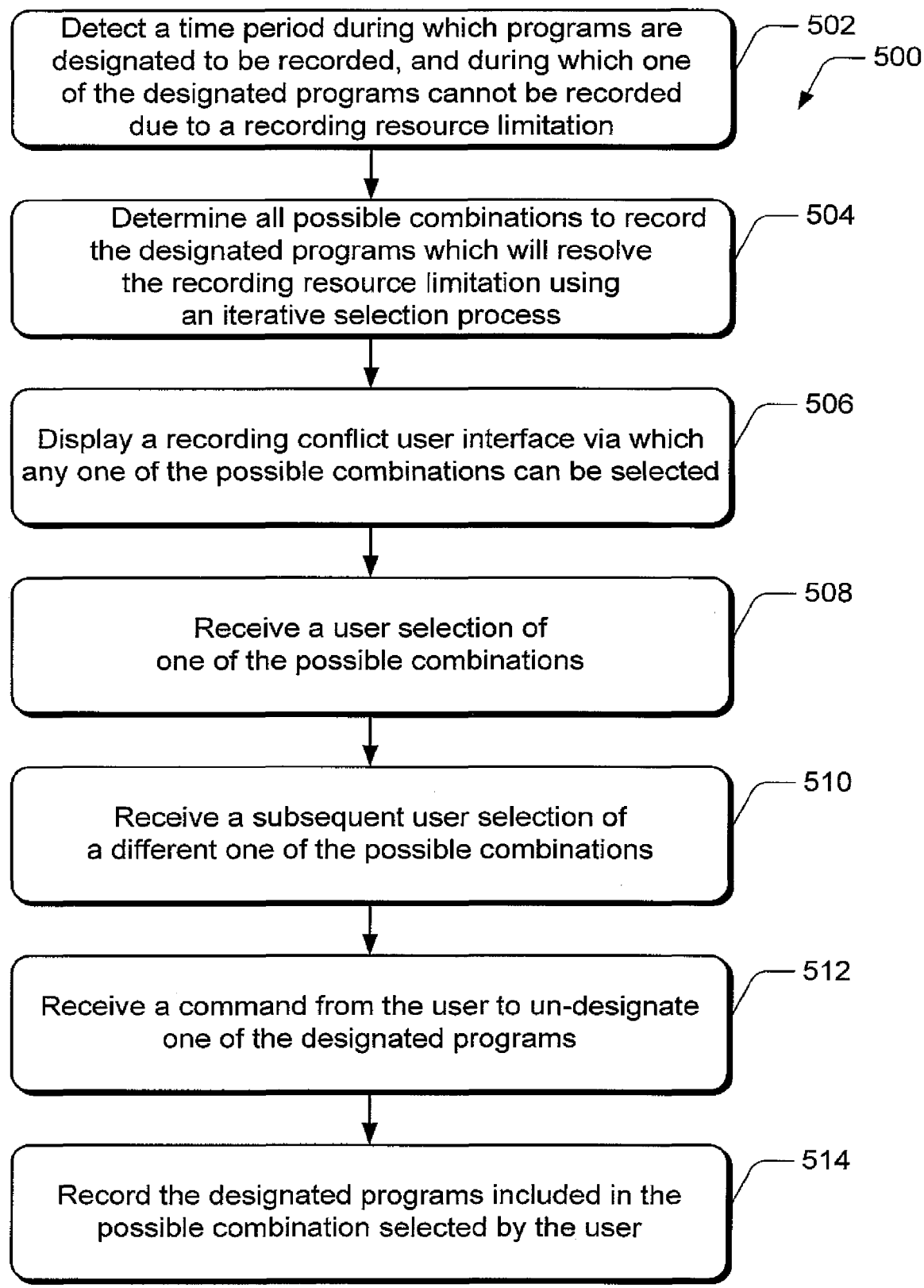
FIG. 5 illustrates exemplary method(s) for recording resource limitation resolution.

FIG. 5 illustrates an exemplary method 500 for recording resource limitation resolution, and is described with reference to the example illustrated in FIGS. 2A-2C. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 502, a time period during which programs are designated to be recorded, and during which one of the designated programs cannot be recorded due to a recording resource limitation, is detected. For example, the 8:00 p.m. to 9:00 p.m. period of contention 204 shown in FIG. 2B is detected.

At block 504, all possible combinations to record the designated programs which will resolve the recording resource limitation are determined using an iterative selection process. For example, the possible combinations to record the designated programs which will resolve the recording resource limitation can be determined using the iterative selection process which was described with reference to FIG. 2C. The possible combinations to record the designated programs correspond to the ordered lists of program identifiers shown in FIG. 2C (e.g., orders lists 218, 220, 222, 224, and 226).

At block 506, a recording conflict user interface is displayed. Any one of the possible combinations which will resolve the recording resource limitation can be selected via the recording conflict user interface. For example, recording conflict user interface 202 is displayed, and the user can view one, some, and/or all of the possible combinations, and can select any one of the possible combinations for recording.

At block 508, a selection of one of the possible combinations is received. For example, the user can select the possible combination displayed on user interface 202, so that programs A, B, C, and D are selected to be recorded, while program N is not selected be recorded. This possible combination of designated programs corresponds to ordered list of program identifiers 218.

At block 510, a subsequent selection of a different one of the possible combinations is received. For example, the user can decide against selecting the possible combination displayed on user interface 202 (which corresponds to ordered list of program identifiers 218), and can instead select one of the other possible combinations (which correspond to the ordered lists 220, 222, 224, and 226).

At block 512, a command to un-designate one of the designated programs which was not included in the one of the possible combinations selected is received. For example, if the user decided to select the possible combination displayed on user interface 202, so that programs A, B, C, and D are selected to be recorded, while program N is not selected to be recorded, the user can un-designate program N which has not been selected for recording. Un-designating the program will simply remove the program from among the group of designated programs, such that the un-designated program will no longer be designated as a program that the user would like to record.

At block 514, the designated programs included in the possible combination selected by the user are recorded. For example, if the user decided to select the possible combination displayed on user interface 202, then programs A, B, C, and D would be recorded, while program N would not be recorded.

Figure 6:
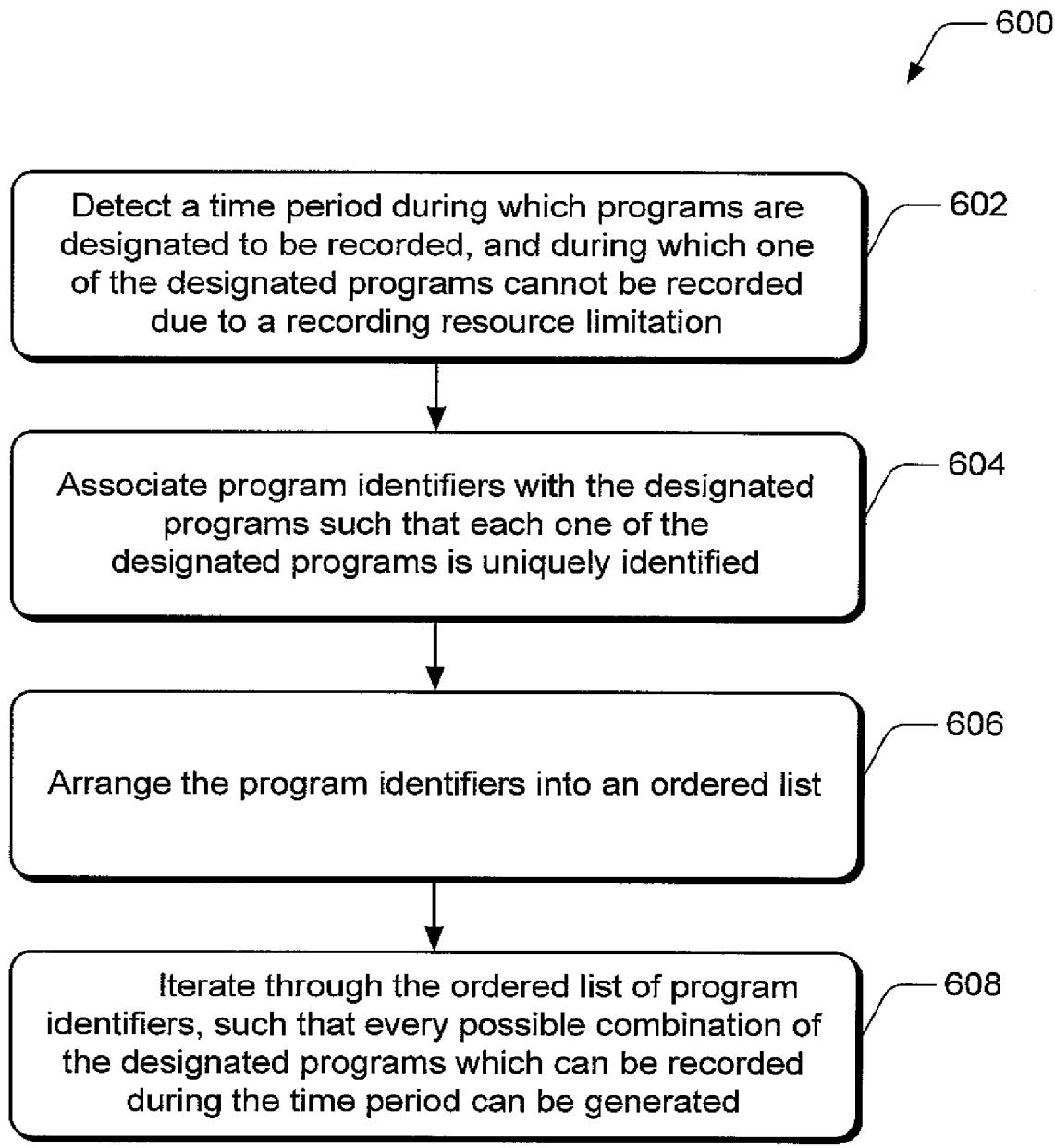
FIG. 6 illustrates exemplary method(s) for recording resource limitation resolution.

FIG. 6 illustrates an exemplary method 600 for recording resource limitation resolution, and is described with reference to FIGS. 2A-2C. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 602, a time period is detected, during which programs are designated to be recorded, and during which one of the designated programs cannot be recorded during the time period due to a recording resource limitation. For example, the 8:00 p.m. to 9:00 p.m. period of contention shown in FIG. 2B is detected.

At block 604, program identifiers are associated with the designated programs such that each one of the designated programs is uniquely identified. For example, FIG. 2C shows a list of program identifiers 218 which are associated with the designated programs 206, such that each one of the designated programs is uniquely identified.

At block 606, the program identifiers are arranged into an ordered list including a first position and a last position. The first position of the ordered list is a non-record position such that only the designated programs associated with the program identifiers located in other than the first position of the ordered list will be recorded during the time period of the recording resource limitation. For example, FIG. 2C shows such an ordered list of program identifiers 218 which includes a first position 228 and a last position 230.

At block 608, the method can include iterating through the ordered list of program identifiers by sequentially moving each one of the program identifiers from the first position of the ordered list to the last position of the ordered list. As a result of such iterating, each one of the program identifiers in the ordered list can be located at the first position, and every possible combination of the designated programs which can be recorded during the time period can be generated. An example of such interating is illustrated at FIG. 2C.

Figure 7:
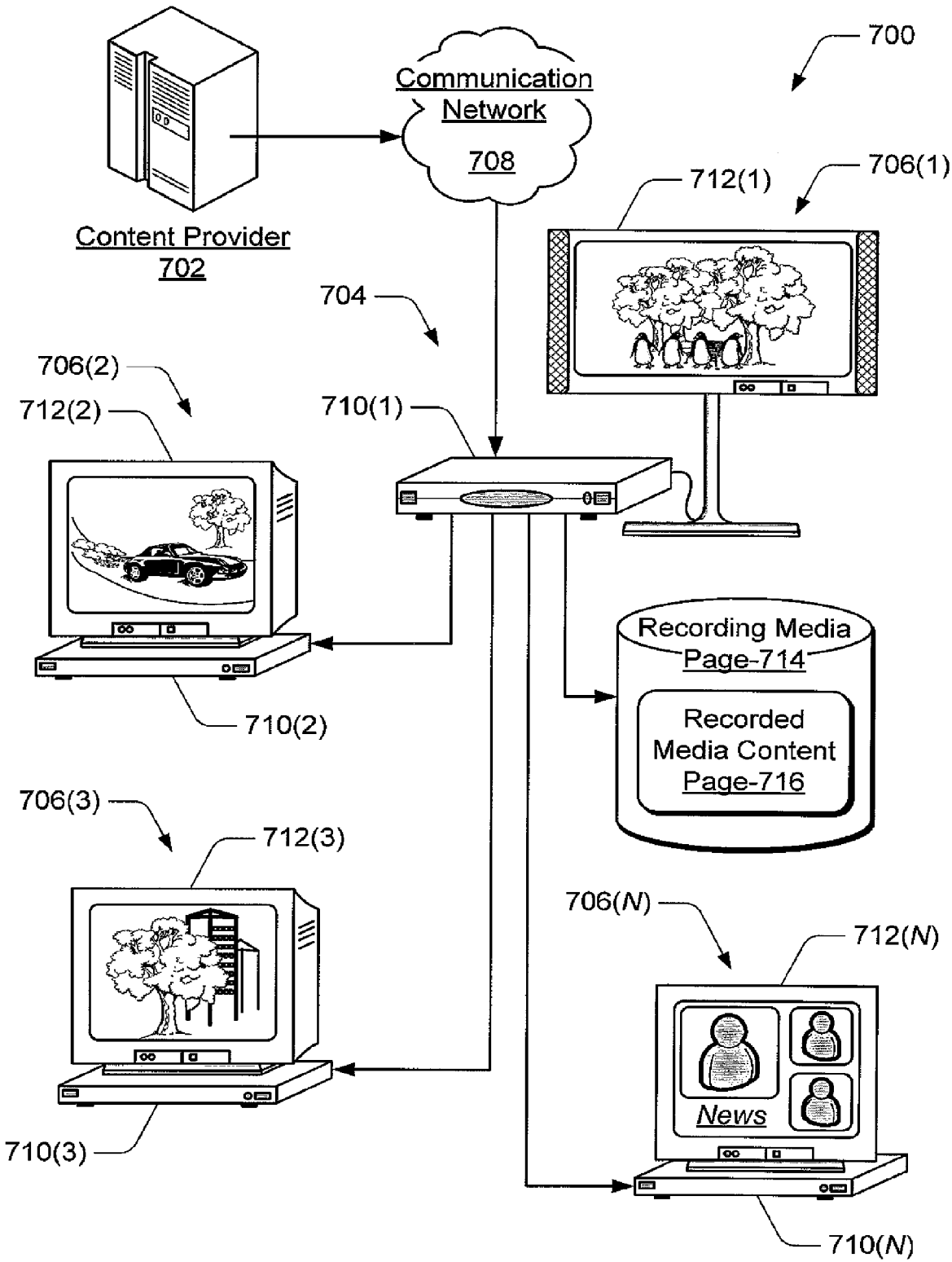
FIG. 7 illustrates an exemplary IP-based television (IPTV) system in which embodiments of recording resource limitation resolution can be implemented.

FIG. 7 illustrates an exemplary IP-based television (IPTV) environment 700 in which embodiments of recording resource limitation resolution can be implemented. The IPTV environment 700 includes a content provider 702 and a viewing system 704 that can include any number of television-based client systems 706. A client system 706(1) is configured for communication with the content provider 702 via a communication network 708 which, in this example, is an IP-based network. In addition to the client system 706(1), the viewing system 704 includes television-based client systems 706(2-N), and can represent a household viewing system that has several viewing areas, such as different rooms, for viewing television programming.

Television-based programs may include any form of programs, commercials, music, movies, video on-demand movies and other media content, recorded media content, interactive games, network-based applications, and any other similar audio, video, and/or image content. In addition, programming in general may include music streamed from a computing device to a client device, such as a television-based set-top box, and may also include video on-demand media content delivered from a server, a photo slideshow, and any other audio, video, and/or image content received from any type of media content source.

The television-based client systems 706(1-N) may be implemented with any number and combination of differing components as further described below with reference to the exemplary client device 800 shown in FIG. 8. Further, the IPTV environment 700 may be implemented with any number and combination of differing components as described below with reference to the exemplary entertainment and information system 900 shown in FIG. 9.

The television-based client system 706(1) includes a client device 710(1) and a display device 712(1), such as any type of television, monitor, LCD, or similar television-based display system that renders audio, video, and/or image data. Similarly, the television-based client systems 706(2-N) each include a respective client device 710(2-N) and a respective display device 712(2-N). Each client device 710 can be implemented in any number of embodiments, such as a television-based set-top box, a digital video recorder (DVR) and playback system, an appliance device, a gaming system, and as any other type of client device that may be implemented in a television-based entertainment and information system.

Client device 710(1) receives program content from content provider 702 via the communication network 708. In the example viewing system 704, client device 710(1) is a master client device that receives one or more data streams from content provider 702 and then arbitrates stream allocation to distribute the data streams, one each, to one or more of the other satellite client devices 710(2-N). The satellite client devices 710(2-N) connect to the master client device 710(1)

to receive a data stream for live television, delayed program viewing, and/or recorded DVR playback. The data streams are allocated by the content provider 702 to the viewing system 704 (e.g., a household), and the data streams can be any combination of high definition and/or standard definition television data streams. For example, the viewing system 704 may receive one high definition data stream and three standard definition data streams depending upon available bandwidth to deliver the data streams.

Although the data streams are not shown specifically, the arrowed communication links illustrate various data communication links which include the data streams. Additionally, the arrowed communication links are not intended to be interpreted as a one-way communication link from client device 710(1) to client device 710(2), for example. It is contemplated that any one or more of the arrowed communication links can facilitate two-way data communication, such as from client device 710(2) to client device 710(1) for example, and from client device 710(1) to content provider 702.

In this system, the master client device 710(1) receives four (4) data streams from the content provider 702 via the communication network 708. A viewing selection from a first data stream is shown for viewing on display device 712(1) at the television-based client system 706(1). A second data stream is directed from the master client device 710(1) to the television-based client system 706(2) and a viewing selection from a second data stream is shown for viewing on display device 712(2). Similarly, a third data stream is directed from the master client device 710(1) to the television-based client system 706(3) and a viewing selection from the third data stream is shown for viewing on display device 712(3). Additionally, a fourth data stream is directed from the master client device 710(1) to the television-based client system 706(4) and a viewing selection from the fourth data stream is shown for viewing on display device 712(4).

The viewing system 704 also includes recording media 714 which can be implemented as a DVR system to record and maintain media content 716, such as any form of programs, movies, and similar audio, video, and/or image content that may be distributed or otherwise received from content provider 702. In one embodiment, the recording media can be implemented as an independent component of the viewing system 704 and connected to the master client device 710(1). Alternatively, the recording media 714 can be implemented as a component of the master client device 710(1) which manages recordings initiated from any of the other satellite client devices 710(2-N). In yet another embodiment, the recording media 714 may be a distributed recording system where any one or more of the client devices 710(1-N) include recording media that is centrally managed by the master client device 710(1).

Figure 8:
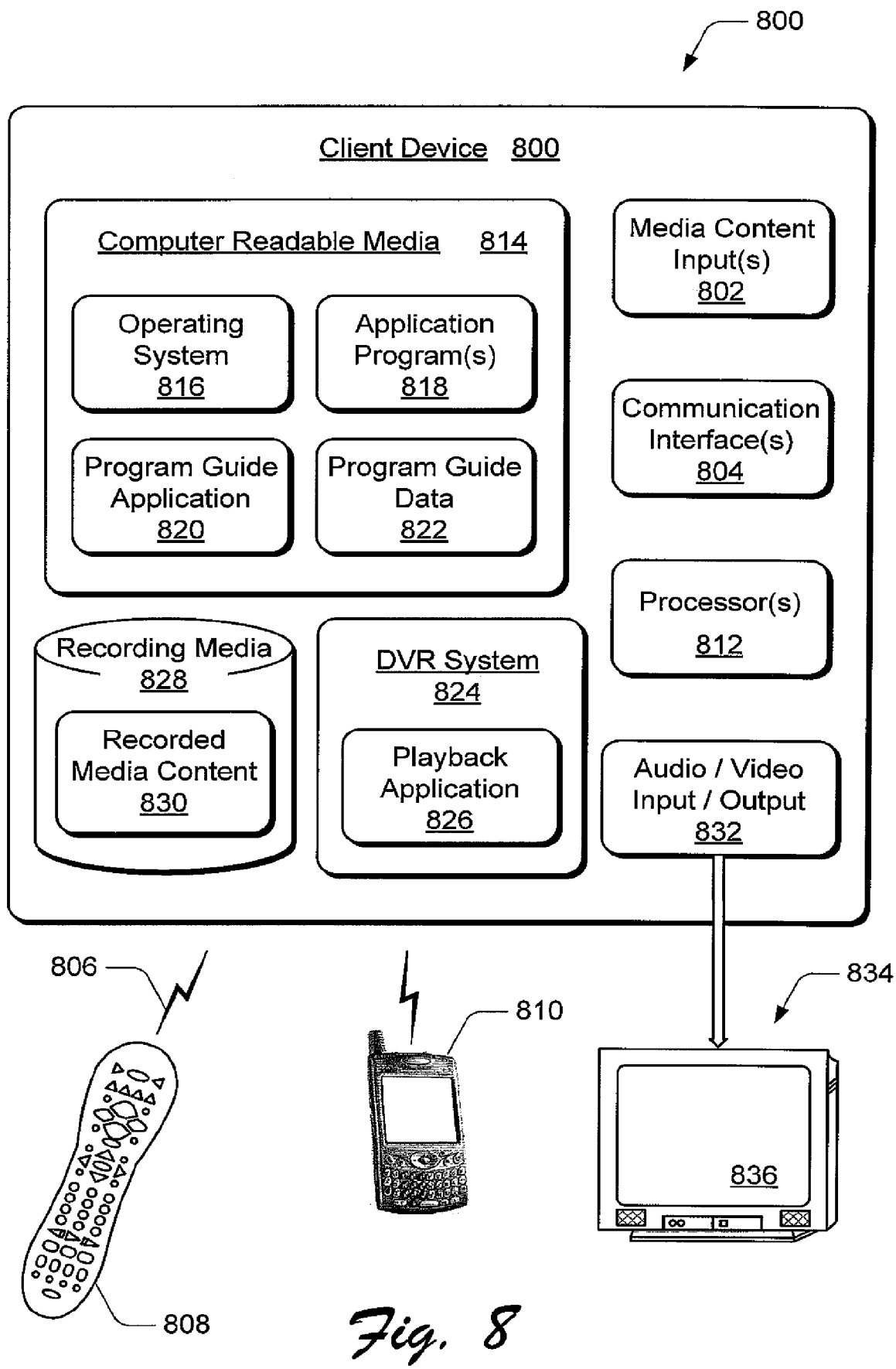
FIG. 8 illustrates various components of an exemplary client device in which embodiments of recording resource limitation resolution can be implemented.

FIG. 8 illustrates various components of an exemplary client device 800 which can be implemented as any form of a computing, electronic, and/or television-based client device, and in which embodiments of recording resource limitation resolution can be implemented. For example, the client device 800 can be implemented as a television-based client device 102 shown in FIG. 1, as the and/or as any one of the television-based client devices 710(1-N) shown in FIG. 7 as part of the viewing system 704.

Client device 800 includes one or more media content inputs 802 which may include Internet Protocol (IP) inputs over which streams of media content are received via an IP-based network. Device 800 further includes communication interface(s) 804 which can be implemented as any one or more of a serial and/or parallel interface, a wireless interface, any type of network interface, a modem, and as any other type of communication interface. A wireless interface enables client device 800 to receive control input commands 806 and other information from an input device, such as from remote control device 808, a portable computing-based device (such as a cellular phone) 810, or from another infrared (IR), 802.11, Bluetooth, or similar RF input device.

A network interface provides a connection between the client device 800 and a communication network by which other electronic and computing devices can communicate data with device 800. Similarly, a serial and/or parallel interface provides for data communication directly between client device 800 and the other electronic or computing devices. A modem facilitates client device 800 communication with other electronic and computing devices via a conventional telephone line, a DSL connection, cable, and/or other type of connection.

Client device 800 also includes one or more processors 812 (e.g., any of microprocessors, controllers, and the like) which process various computer executable instructions to control the operation of device 800, to communicate with other electronic and computing devices, and to implement embodiments of recording resource limitation resolution. Client device 800 can be implemented with computer readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 814 provides data storage mechanisms to store various information and/or data such as software applications and any other types of information and data related to operational aspects of client device 800. For example, an operating system 816 and/or other application programs 818 can be maintained as software applications with the computer readable media 814 and executed on processor(s) 812 to implement embodiments of recording resource limitation resolution.

For example, client device 800 can be implemented to include a program guide application 820 that is implemented to process program guide data 822 and generate program guides for display which enable a viewer to navigate through an onscreen display and locate broadcast programs, recorded programs, video on-demand programs and movies, interactive game selections, network-based applications, and other media access information or content of interest to the viewer. Alternatively, a programmed application can be implemented as an integrated module or component of the program guide application 820 to implement embodiments of recording resource limitation resolution. The client device 800 can also include a DVR system 824 with playback application 826, and recording media 828 to maintain recorded media content 830.

The client device 800 also includes an audio and/or video output 832 that provides audio and video to an audio rendering and/or display system 834, or to other devices that process, display, and/or otherwise render audio, video, and image data. Video signals and audio signals can be communicated from device 800 to a display device 836 via an RF (radio frequency) link, S-video link, composite video link, component video link, analog audio connection, or other similar communication link.

Figure 9:
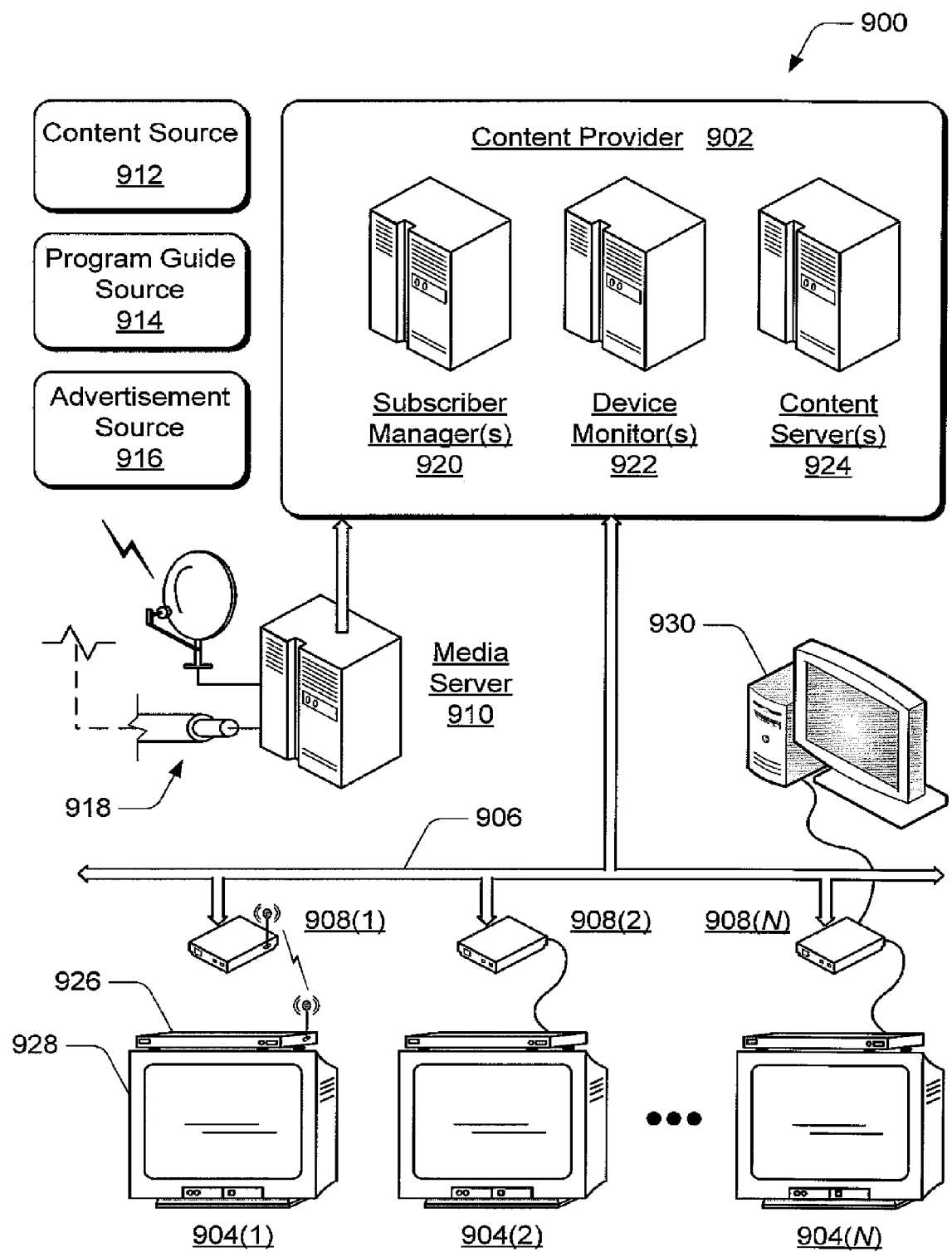
FIG. 9 illustrates various devices and components in an exemplary entertainment and information system in which embodiments of recording resource limitation resolution can be implemented.

FIG. 9 illustrates an exemplary entertainment and information system 900 in which an IP-based television environment can be implemented, and in which embodiments of recording resource limitation resolution can be implemented. System 900 facilitates the distribution of program content, program guide data, and advertising content to multiple viewers and to multiple viewing systems. System 900 includes a content provider 902 and television-based client systems 904(1-N) each configured for communication via an IP-based network 906. Each television-based client system 904(1-N) is an example of the television-based client system 706(1) described with reference to FIG. 7. Each of the television-based client systems 904(1-N) can receive one or more data streams from content provider 902 and then arbitrate stream allocation to distribute the data streams, one each, to one or more other satellite client devices in a viewing system.

The network 906 can be implemented as a wide area network (e.g., the Internet), an intranet, a Digital Subscriber Line (DSL) network infrastructure, or as a point-to-point coupling infrastructure. Additionally, network 906 can be implemented using any type of network topology and any network communication protocol, and can be represented or otherwise implemented as a combination of two or more networks. A digital network can include various hardwired and/or wireless links 908(1-N), routers, gateways, and so on to facilitate communication between content provider 902 and the client systems 904(1-N). The television-based client systems 904 (1-N) receive program content, program guide data, advertising content, closed captions data, and the like from content server(s) of the content provider 902 via the IP-based network 906.

System 900 includes a media server 910 that receives program content from a content source 912, program guide data from a program guide source 914, and advertising content from an advertisement source 916. In an embodiment, the media server 910 represents an acquisition server that receives the audio and video program content from content source 912, an EPG server that receives the program guide data from program guide source 914, and/or an advertising management server that receives the advertising content from the advertisement source 916.

The content source 912, the program guide source 914, and the advertisement source 916 control distribution of the program content, the program guide data, and the advertising content to the media server 910 and/or to other television-based servers. The program content, program guide data, and advertising content is distributed via various transmission media 918, such as satellite transmission, radio frequency transmission, cable transmission, and/or via any number of other wired or wireless transmission media. In this example, media server 910 is shown as an independent component of system 900 that communicates the program content, program guide data, and advertising content to content provider 902. In an alternate implementation, media server 910 can be implemented as a component of content provider 902.

Content provider 902 is representative of a headend service in a television-based content distribution system, for example, that provides the program content, program guide data, and advertising content to multiple subscribers (e.g., the television-based client systems 904(1-N)). The content provider 902 can be implemented as a satellite operator, a network television operator, a cable operator, and the like to control distribution of program and advertising content, such as movies, television programs, commercials, music, and other audio, video, and/or image content to the client systems 904(1-N).

Content provider 902 includes various components to facilitate media data processing and content distribution, such as a subscriber manager 920, a device monitor 922, and a content server 924. The subscriber manager 920 manages subscriber data, and the device monitor 922 monitors the client systems 904(1-N) (e.g., and the subscribers), and maintains monitored client state information.

Although the various managers, servers, and monitors of content provider 902 (to include the media server 910 in one embodiment) are illustrated and described as distributed, independent components of content provider 902, any one or more of the managers, servers, and monitors can be implemented together as a multi-functional component of content provider 902. Additionally, any one or more of the managers, servers, and monitors described with reference to system 900 can implement features and embodiments recording resource limitation resolution.

The television-based client systems 904(1-N) can be implemented to include a client device 926 and a display device 928 (e.g., a television). A client device 926 of a television-based client system 904 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 904(N) is implemented with a computing device 930 as well as a client device 926. Additionally, any of the client devices 926 of a client system 904 can implement features and embodiments of recording resource limitation resolution as described herein.

Although embodiments of recording resource limitation resolution have been described in language specific to features and/or methods, it is to be understood that the subject of the appended claims is not necessarily limited to the specific features or methods described. Rather, the specific features and methods are disclosed as exemplary implementations of recording resource limitation resolution.

The invention claimed is:

1. A method, comprising:
   detecting, by a client device, a time period during which programs are designated to be recorded by a recording device, and during which one of the designated programs cannot be recorded due to a recording resource limitation;
   determining, by the client device, non-conflicting combinations to record the designated programs which will resolve the recording resource limitation using an iterative selection process, the iterative selection process including iterating through a list of the designated programs to determine the non-conflicting combinations; and
   displaying, by the client device, a recording conflict user interface that illustrates the non-conflicting combinations in which any one of the non-conflicting combinations that will resolve the recording resource limitation can be selected.

2. A method as recited in claim of claim 1, wherein the determining includes:
   associating program identifiers with the designated programs such that each one of the designated programs is uniquely identified;
   arranging the program identifiers into an ordered list including a first position and a last position, the first position of the ordered list being a non-record position such that only the designated programs associated with program identifiers located in positions other than the first position of the ordered list will be recorded during the time period of the recording resource limitation; and
   iterating through the ordered list of program identifiers by sequentially moving each one of the program identifiers from the first position of the ordered list to the last position of the ordered list, such that each one of the program identifiers in the ordered list can be located at the first position, and such that each non-conflicting combination of the designated programs that can be recorded during the time period can be generated.

3. A method as recited in claim 1, further comprising receiving a user selection of one of the non-conflicting combinations that will resolve the recording resource limitation, the selected non-conflicting combination including a subset of the designated programs.

4. A method as recited in claim 3, further comprising receiving a subsequent user selection of a different one of the non-conflicting combinations that will resolve the recording resource limitation, the selected different one of the non-conflicting combinations including a different subset of the designated programs.

5. A method as recited in claim 3, further comprising receiving a user command to un-designate one of the designated programs that was not included in the selected non-conflicting combination.

6. A method as recited in claim 3, further comprising recording the designated programs included in the selected non-conflicting combination.

7. A method as recited in claim 1, wherein the displaying includes presenting each one of the non-conflicting combinations in a repeatable sequence, such that each non-conflicting combination is presented.

8. A method as recited in claim 1, wherein the displaying includes presenting a graphical representation of the time period of the recording resource limitation without presenting graphical representations of other time periods.

9. A method as recited in claim 1, wherein the displaying includes presenting a graphical representation of the time period of the recording resource limitation and a graphical representation of the designated programs.

10. A method as recited in claim 1, wherein the displaying includes presenting a graphical representation of the designated programs such that the designated program that cannot be recorded due to the recording resource limitation is identified by a non-record marker.

11. A method comprising:
   detecting, by a client device, a time period during which programs are designated to be recorded by a recording device, and during which one of the designated programs cannot be recorded due to a recording resource limitation;
   associating, by the client device, program identifiers with the designated programs such that each one of the designated programs is uniquely identified;
   arranging, by the client device, the program identifiers into an ordered list including a first position and a last position, the first position of the ordered list being a non-record position such that designated programs associated with program identifiers located in positions other than the first position of the ordered list will be recorded during the time period of the recording resource limitation; and
   iterating, by the client device, through the ordered list of program identifiers by sequentially moving each one of the program identifiers from the first position of the ordered list to the last position of the ordered list, such that each one of the program identifiers in the ordered list can be located at the first position, and such that each non-conflicting combination of the designated programs that can be recorded during the time period can be generated.

12. A method as recited in claim 11, further comprising displaying a recording conflict user interface in which each non-conflicting combination of the designated programs that can be recorded during the time period can be sequentially displayed, and such that any one of the non-conflicting combinations can be selected.

13. A method as recited in claim 12, further comprising receiving a user selection of one of the non-conflicting combinations of the designated programs that can be recorded during the time period, the selected non-conflicting combination including a subset of the designated programs.

14. A method as recited in claim 12, wherein the displaying includes presenting a graphical representation of the time period of the recording resource limitation and a graphical representation of the designated programs.

15. A method as recited in claim 12, wherein the displaying includes presenting a graphical representation of the designated programs such that the designated program that cannot be recorded due to the recording resource limitation is identified by a non-record marker.

16. One or more computer readable storage media encoded with computer executable instructions that, when executed, direct a computing-based system to perform operations comprising:
   detecting a time period during which programs are designated to be recorded, and during which one of the designated programs cannot be recorded due to a recording resource limitation;
   associating program identifiers with the designated programs such that each one of the designated programs is uniquely identified; and
   arranging the program identifiers into an ordered list including a first position and a last position, the first position of the ordered list being a non-record position such that only the designated programs associated with program identifiers located in positions other than the first position of the ordered list will be recorded during the time period of the recording resource limitation, an initial arrangement of the ordered list corresponds to one non-conflicting combination of designated programs that can be recorded during the time period of the recording resource limitation; and
   iterating through the ordered list of program identifiers by sequentially moving each one of the program identifiers from the first position of the ordered list to the last position of the ordered list to generate different ordered lists that each correspond to a different non-conflicting combination of designated programs that can be recorded during the time period of the recording resource limitation.

17. One or more computer readable storage media as recited in claim 16, the operations further comprising iterating through the ordered list of program identifiers such that each non-conflicting combination of the designated programs that can be recorded during the time period is generated.

18. One or more computer readable storage media as recited in claim 16, the operations further comprising displaying a recording conflict user interface that illustrates any one of the non-conflicting combinations of designated programs that can be selected and recorded during the time period of the recording resource limitation.

19. One or more computer readable storage media as recited in claim 17, the operations further comprising receiving a user selection through the recording conflict user interface that indicates that the one non-conflicting combination of designated programs represented by the initial arrangement of the ordered list is to be recorded.

20. One or more computer readable storage media as recited in claim 17, the operations further comprising receiving a user selection via the recording conflict user interface that indicates that the one non-conflicting combination of designated programs represented by the initial arrangement of the ordered list is not to be recorded, the user selection causing at least one iteration of the ordered list.

* * * * *

UNITED STATES PATENT AND TRADEMARK OFFICE
CERTIFICATE OF CORRECTION

PATENT NO. : 7,809,242 B2  
APPLICATION NO. : 11/426261  
DATED : October 5, 2010  
INVENTOR(S) : Vivian Nan Jiang et al.

Page 1 of 1

It is certified that error appears in the above-identified patent and that said Letters Patent is hereby corrected as shown below:

In column 24, line 52, in Claim 2, after "such that" delete "only the".

In column 26, line 26, in Claim 16, after "such that" delete "only the".

Signed and Sealed this  
Third Day of May, 2011

David J. Kappos  
*Director of the United States Patent and Trademark Office*